United States Patent [19]

Evans

[11] 4,322,804
[45] Mar. 30, 1982

[54] STORAGE CONVEYOR OPERATION SYSTEM AND SURVEILLANCE SYSTEM

[75] Inventor: Edward N. Evans, Long Beach, Calif.

[73] Assignee: Park Mobile, Inc., New York, N.Y.

[21] Appl. No.: 76,924

[22] Filed: Sep. 19, 1979

[51] Int. Cl.³ .................. G06F 15/48; G08G 1/14; E04H 6/06
[52] U.S. Cl. .................. 364/478; 250/221; 340/51; 364/424; 414/231; 414/232
[58] Field of Search .......... 364/478, 424, 436, 439; 414/227, 231, 232, 240, 247, 248, 251, 252, 246, 228; 198/349, 356, 358, 793, 794, 798, 810; 235/92 TC; 340/38 R, 38 P, 51, 556, 528, 541, 529, 551, 552, 521, 565, 567; 250/221, 222 R, 223 R, 224

[56] References Cited

U.S. PATENT DOCUMENTS

| | | | |
|---|---|---|---|
| 3,148,785 | 9/1964 | Fauconnier | 414/232 X |
| 3,323,617 | 6/1967 | Inuzuka et al. | 414/232 X |
| 3,486,008 | 12/1969 | Mori | 235/92 TC X |
| 3,710,956 | 1/1973 | Meyer et al. | 414/232 X |
| 3,723,738 | 3/1973 | Brenner et al. | 250/221 X |
| 3,789,384 | 1/1974 | Akers | 250/221 X |
| 3,794,966 | 2/1974 | Platzman | 340/51 X |
| 3,835,449 | 9/1974 | Uiracola | 340/38 R |
| 3,898,639 | 8/1975 | Muncheryan | 340/529 |
| 3,927,389 | 12/1975 | Neeloff | 364/424 X |
| 3,984,012 | 10/1976 | Ennis | 414/231 |

FOREIGN PATENT DOCUMENTS 42-4642144 5/1967 Japan .................. 340/38

*Primary Examiner*—Joseph F. Ruggiero
*Attorney, Agent, or Firm*—Larson and Taylor

[57] ABSTRACT

A system for operating a vehicle storage conveyor is disclosed in which a programmable digital computer system is used to automatically control the operation of the conveyor, to monitor the safeties of the storage conveyor and to cease operation thereof upon the detection of an unsafe condition, and for controlling a plurality of electromagnetic radiation beam transmitting and detecting devices systematically located throughout a loading area of the storage conveyor so as to detect the presence of a vehicle or a person and to distinguish between them. The system prevents operation of the vehicle conveyor until the vehicle is properly positioned thereon and the person who drove the vehicle is detected as leaving the conveyor loading system.

16 Claims, 26 Drawing Figures

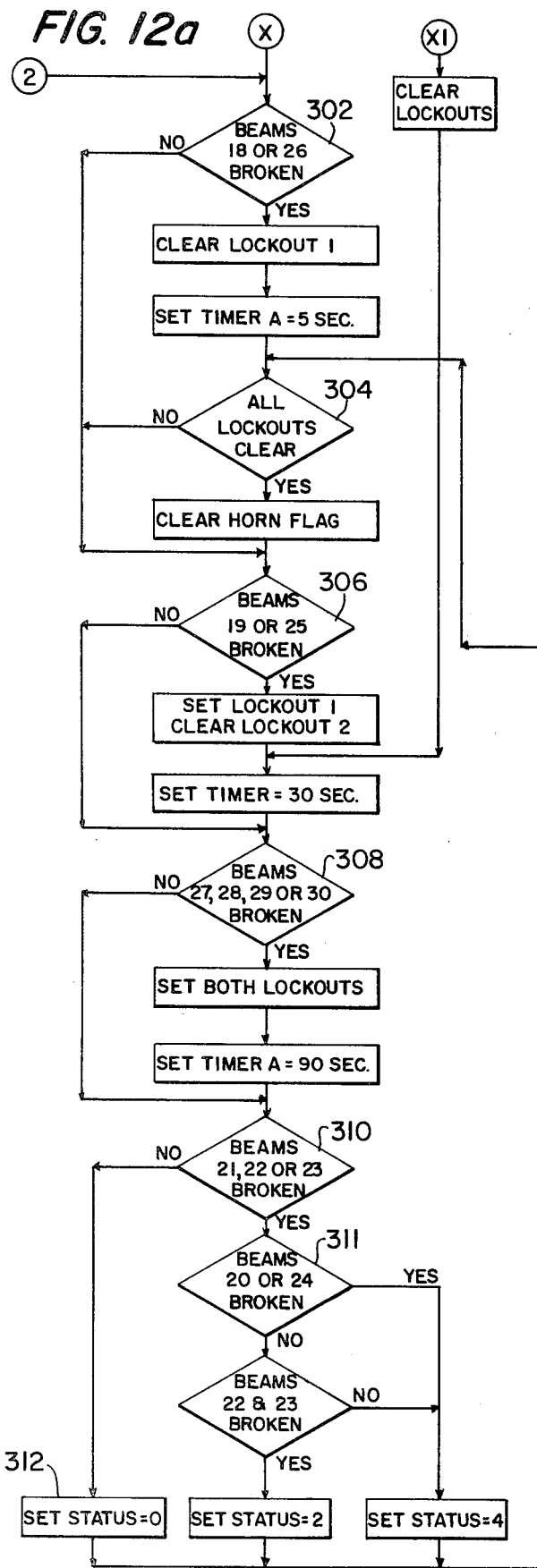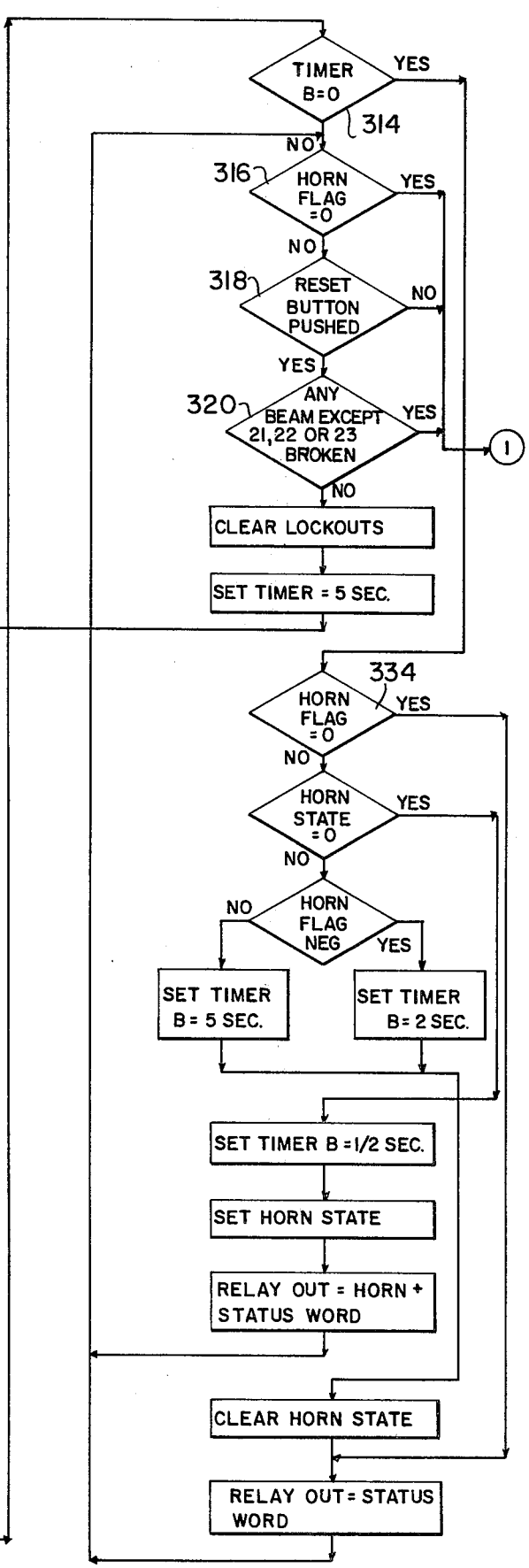
FIG. 12a

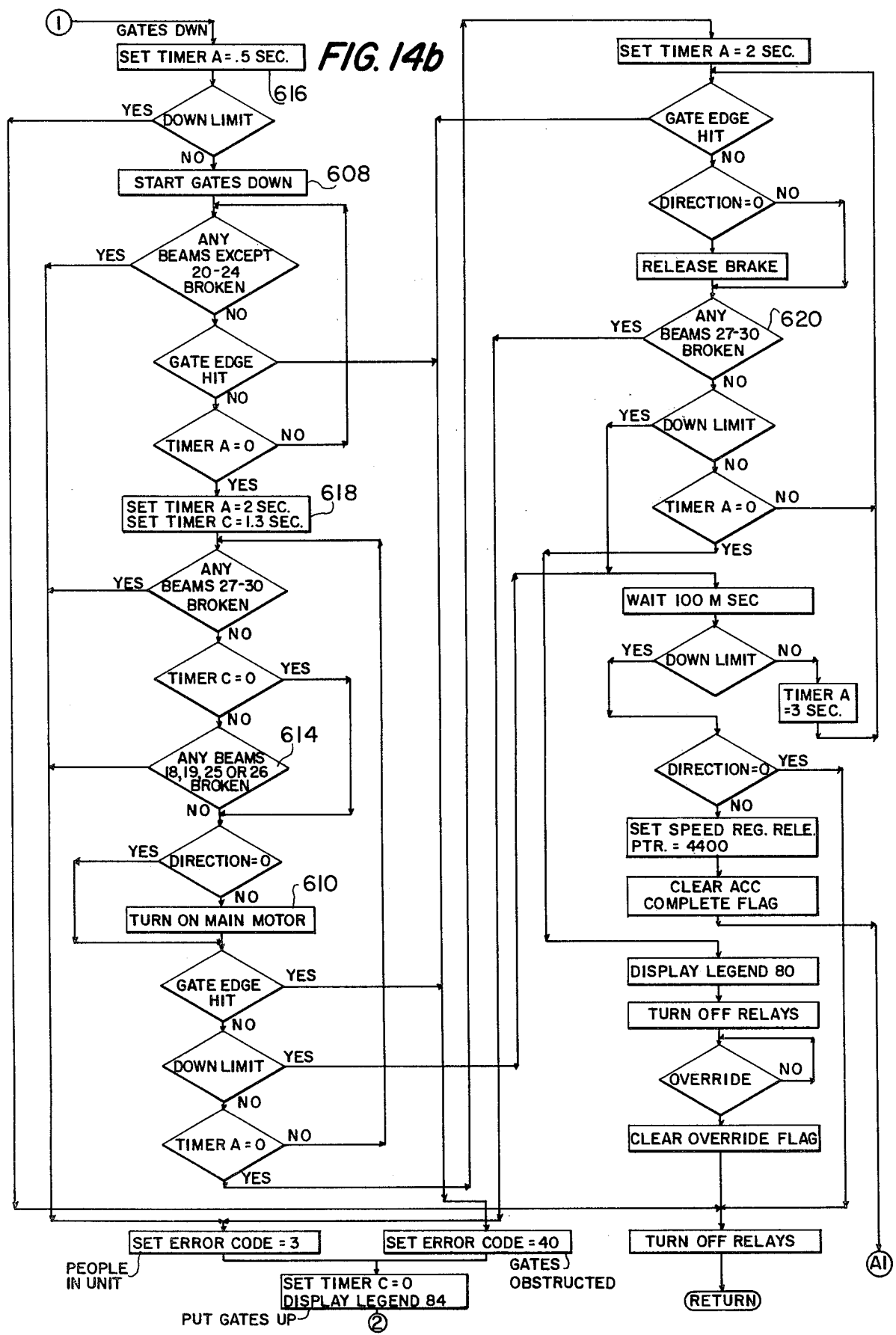

FIG. 17 NORMAL PARK SEQUENCE

STORAGE CONVEYOR OPERATION SYSTEM AND SURVEILLANCE SYSTEM

FIELD OF THE INVENTION

The present invention relates to an operating system for a storage conveyor and in particular relates to a computer controlled operating system for conducting a security surveillance of the conveyor area, for determining the entering and exiting of people or items into and out of the conveyor area, and for selecting and retrieving items stored on the conveyor. The system also relates in particular to a conveyor control system for monitoring and adjusting the acceleration, deceleration, and operating speed of the conveyor and for determining the particular direction of rotation of an endless conveyor.

BACKGROUND OF THE INVENTION

Generally speaking, the more automated a conveyor system, a storage system, or a transportation system is, the more sophisticated the control mechanisms and telemetric devices must be. One such system is a conventional automobile parking tower which has been in public operation since the early 1970's. This parking tower is disclosed in a number of United States patents by Lichti and Lichti et al, such as U.S. Pat. No. 3,656,608 (incorporated herein by reference). Such a parking tower has a number of items which must be constantly checked to ensure the safe operation of the tower. Among these items to be checked are the absence of any people in the tower area when the conveyor is operated; detection of the entering or exiting of a vehicle; detection or a properly positioned vehicle on a conveyor pan; and detection of any vehicle doors that were left open. The aforementioned conventional parking tower also disclosed in the Lichti et al patents utilizes two mechanical sweeping arms for sweeping close to the sides of a vehicle in a pan located at the tower entrance to determine if a vehicle door were left open. Upon the striking of a vehicle door, the arm activates a microswitch, which in turn provides a signal to indicate an open door and to stop the operation of the parking tower.

Other patents disclose other means for detecting the presence of a vehicle in a conveyor pan or the presence of people in the protected area. Thus, the Inuzuka et al U.S. Pat. No. 3,323,617 (incorporated herein by reference) discloses the use of three photoelectric detecting means located at the entrance and exit to the parking tower for determining the entering, the presence, or the exiting of a vehicle on a conveyor pan. An electrical signal circuit using a plurality of microswitches and electrical storage means (latching relays) is depicted for keeping track of which parking cages are empty and which are full.

The United States Patent to Cheal et al, U.S. Pat. No. 3,877,002 discloses an intrusion detecting system that uses a microwave transmitter and receiver for irradiating microwave energy in a predetermined beam pattern having a unique amplitude modulation and for receiving a signal when the beam is interrupted. Whenever the beam is detected as being interrupted, the device provides an output signal to an alarm. By providing a modulated signal, a plurality of microwave units can be used at the same time without mutual interference.

A system for detecting the presence, the leaving, or the entering of people is disclosed in the patent to Muncheryran, U.S. Pat. No. 3,898,639. The system disclosed in this patent utilizes four laser beams projected on different sides of a wall or fence and the interruption of a particular beam determines whether an individual is attempting to enter or leave the walled area.

The patent to Schwarz U.S. Pat. No. 3,130,298 discloses an electrical circuit and switches for counting a number of vehicles entering and leaving different parking areas of a parking garage. The Cheal et al, Muncheryan and Schwarz patents are incorporated herein by reference.

However, none of the aforementioned systems disclose any means for distinguishing between people and automobiles, for monitoring and controlling the operation, automatically, of a storage conveyor, and which can also determine the undesirable presence of persons within the conveyor operating area.

SUMMARY OF THE INVENTION

The present invention offers significant advantages over the control and surveillance systems of the prior art. These advantages include, but are not limited to, a centralized, multi-purpose computer operated system that can control the normal operation of a car elevator while practically simultaneously monitoring all of the safeties to ensure that the tower is operated only within pre-determined limits and is not operated whenever a dangerous condition is detected.

The present invention is discussed as applied in particular to a conventional parking tower that has been operational for approximately nine years. This tower is an improved version over the towers disclosed in the Lichti, U.S. Pat. Nos. 3,278,052; 3,424,321; 3,547,281; 3,627,110; and 3,656,608. All of these patents are incorporated herein by reference for the purposes of disclosing a particular storage conveyor that is controllable by the present invention. Therefore, the particular structural details of such a conveyor or parking tower will only be discussed generally.

DETAILED DESCRIPTION OF THE DRAWINGS

FIGS. 12a and 12b is a detailed flow diagram of the car exit subroutine.

FIG. 14a and 14b is a detailed flow diagram of the gate up/down subroutine.

DETAILED DESCRIPTION OF THE PRESENTLY PREFERRED EMBODIMENTS

Figure 1:
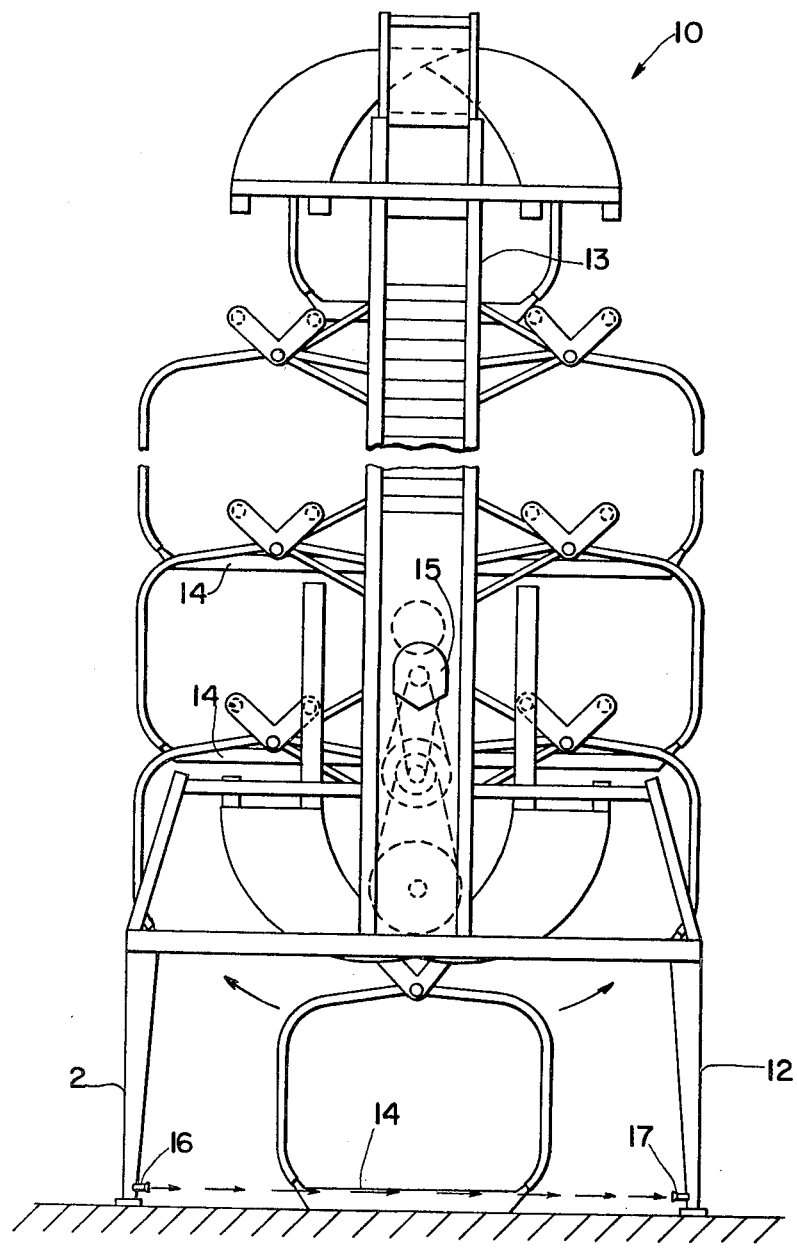
FIG. 1 is a front elevational view of a vehicle parking tower or elevator that can be operated by the present invention and depicting the use of a security surveillance system also in accordance with the present invention.
Figure 19:
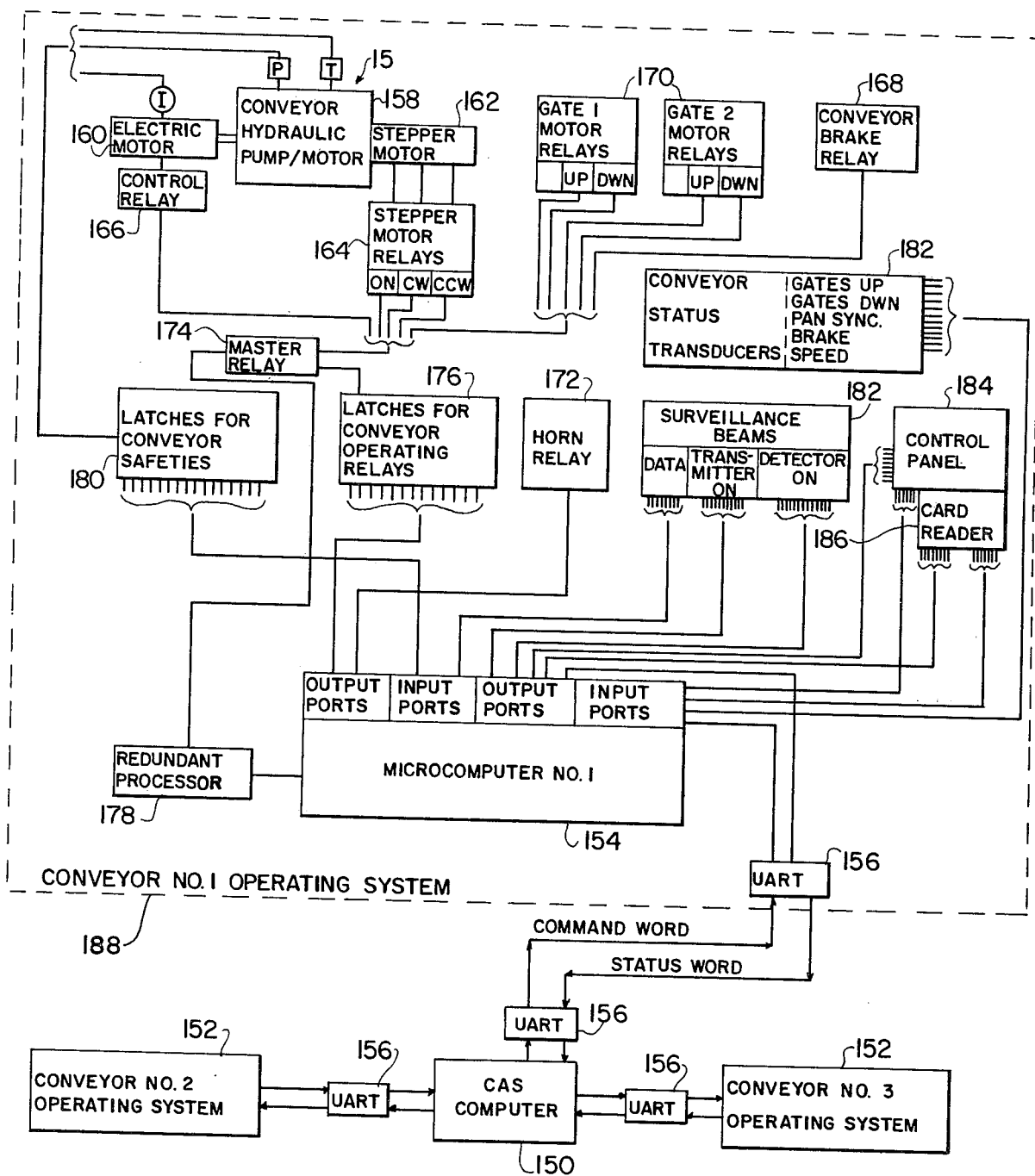
FIG. 19 is a diagrammatic electronic diagram showing the interconnections between a central computer and individual, peripheral microcomputer controlled operating systems individual to each car elevator.

Referring now to the drawings, wherein like numerals are used to denote like elements throughout the several views, a presently preferred embodiment of the present invention is depicted in FIGS. 1 and 19 in combination with an automobile parking tower or car elevator 10. Car elevator 10 is only generally described and reference should be had to Lichti U.S. Pat. No. 3,656,608 for greater details thereof. Elevator 10 is comprised of a base 12 which supports a vertically extending tower structure 13. Carried on tower structure 13 are a plurality of conveyor pans 14. A suitable motor, generally designated at 15, is used to revolve conveyor pans 14 in a vertical plane about tower 13 by means of a conveyor belt (not shown) and support members which are fully described in the aforementioned Lichti patent. Conveyor pans 14 can thus be moved by motor 15 relative to base 12. Car elevator 10 is also depicted (FIG. 2) as having an entrance 10a and an exit 10b to a loading/unloading stall 10c and having conventional raisable gates (not shown) at each end thereof.

Mounted about base 12 are a plurality of detection means, such as a source 16 of electromagnetic radiation and a detector 17 thereof mounted opposite source 16 and in line therewith. Detector 17 is preferably capable of detecting only the electromagnetic radiation that has been emitted by source 16. In some cases, the detection means can be comprised of a conventional photoelectric device that emits and detects a beam of light, either in the visible or near-visible frequency range, as described hereinbelow. In other cases the detection means can be comprised of a conventional polarized, microwave transmitter and detector, as described hereinbelow.

In essence, car elevator 10 is merely an endless conveyor having a plurality of storage locations thereon, the storage locations being pans 14. Described hereinbelow is a particular computer controlled operating system for a conveyor in general and car elevator 10 in particular. Obviously, the particular details of the present invention are highly dependent upon the particular conveyor being operated. Nevertheless, it is still instructive to describe in detail the present invention as implemented with a particular type of conveyor such as car elevator 10.

The computer controlled conveyor operating system of the present invention is illustrated with respect to car elevator 10 in FIG. 19 and is based upon a master computer, such as Central Accounting System (CAS) computer 150, having an overall control capability of a plurality of separate computers that are individual to each conveyor operating system 152, such as a microprocessor-based computer or microcomputer 154. In the particular embodiment shown in FIG. 19, CAS computer 150 is used to monitor and control the individual microcomputers 154 through a command word and a status word serially sent to and received from the individual microcomputers through corresponding pairs of UARTs 156 (Universal Asynchronous Receiver-Transmitter). UARTs 156 are conventional, commerically available circuits and an exemplary one can be the IM6402 integrated circuit manufactured by Intersil Corporation.

An exemplary microporcessor that can be used in microcomputers 154 is the HM6100 microprocessor manufactured by Harris Semiconductor. The 6100 is a single address, fixed word length, parallel transfer microprocessor using 12-bit, two's complement arithmetic. The processor recognizes the well known computer program instruction set of the PDP8/E minicomputer manufactured by Digital Equipment Corporation. The architectural features of the 6100 microprocessor which are utilized in the present invention include the direct, indirect, and auto indexed memory addressing, direct memory access, 12-bit input and output ports, and a "transparent" control panel.

Microcomputer 154 controls and monitors the conveyor operating system by transmitting and receiving signals from its output and input ports, respectively. Exemplary devices which are controlled by microcomputer 154 and exemplary transducers which provide information to microcomputer 154 are depicted in FIG. 19.

A major device controlled by microcomputer 154 is elevator motor 15. In an exemplary conventional elevator, elevator motor 15 uses a closed loop hydrostatic transmission that is comprised of an hydraulic pump/motor 158 and an electric motor 160 directly coupled to the hydraulic pump half of pump/motor 158. The hydraulic pump is commercially available and preferably is a variable displacement, unidirectional axial piston pump that runs at constant speed and which can be shifted from forward to reverse and can have the quantity of hydraulic fluid flow controlled by the angle of a swash plate inside the pump. The swash plate can be conventionally controlled by a hyraulic displacement control valve operated by a stepper motor 162. Stepper motor 162 and electric motor 160 are in turn operated through conventional control relays 164 and 166. Stepper motor relays 164 actually are comprised of a plurality of relays which turn on the stepper motor 162 and which control the direction of its operation so as to provide either a clockwise or a counterclockwise rotation of car elevator 10.

Other devices controlled by microcomputer 154 which in turn control the operation of elevator 10 include a conventional disc brake hydraulically pulled apart against spring pressure and connected to the drive chain of elevator 10 for normal stopping and locking of the drive chain. The disc brake (not shown) is operated through a hydraulic piston which is in turn controlled by a solenoid valve (not shown) operated by a relay 168. In addition, the forward and rearward gates at each end of elevator 10 are conventionally raised with an electric motor which is energized in the proper direction through gate motor relays 170. Finally, a conventional horn is turned on and off through a corresponding relay 172.

The outputs from each of the aforementioned relays are connected through a master relay 174, which can turn off all of the other relays, to conventional latches 176, electrically connected in turn to output ports of microcomputer 154. By using latches 176, each relay can be controlled with one bit from an output port which consists of twelve bits. As described hereinbelow, simply by having the microprocessor output an appropriate word to the output port having the appropriate bit set high (for a positive control type system), the relay ultimately connected to that bit of that output port will be controlled and turned on.

Master relay 174 is in turn controlled by a redundant processor 178 such that when operated, it in turn de-energizes all of the other relays. As explained more fully hereinbelow, microprocessor 154 is controlled by computer programming using the interrupt mode principle. In this manner, the operation of the microcomputer is constantly, periodically interrupted and caused to go through a separate interrupt routine (also explained hereinbelow). Redundant processor 178 monitors the interrupt signals sent to the microprocessor in microcomputer 154 and whenever the microprocessor is not periodically interrupted, thereby indicating a problem with the computer control system, redundant processor 178 will deactivate master relay 174 which in turn de-energizes all of the other relays and prevents operation of elevator 10. In a presently preferred embodiment, redundant processor 178 simply is comprised of a retriggerable monostable multivibrator such as integrated circuit number 74123. The multivibrator is constantly kept in a high state by being continuously retriggered by the interrupt circuitry of microcomputer 154. With an adjustable time delay, preferably about 10 milliseconds for an interrupt frequency of 1000 Hz, whenever the multivibrator is not triggered, it will output a pulse after this predetermined time delay. By using a redundant processor 178, microcomputer 154 can be simplified and made less expensive, while maintaining a high reliability factor and a fail-safe type of operation.

Elevator 10 is monitored by a plurality of safeties, the activation of any of which can cause the conveyor operating system 152 to shut down. These safeties are connected to latches 180, which in turn are connected to an input port of microcomputer 154 and periodically sampled during the interrupt routine in the computer program, as discussed in greater detail hereinbelow. Exemplary safeties depicted in FIG. 19 would include the temperature and pressure of the hydraulic fluid in pump/motor 158 and the current drawn by electric motor 160. Other safeties could respond to irregularities in the operation of elevator 10, such as one of the gates striking an object, or one of a plurality of "tripper wires" being struck, for example, by an opened vehicle door. Furthermore, such safeties could include over speed or under speed operation of elevator 10. Clearly, it would be obvious to include other safeties.

In addition to safeties being monitored by microcomputer 154, the particular status of the conveyor is also monitored by a plurality of transducers, depicted 182 in FIG. 19. Exemplary status transducers are indicated in box 182 and include limit switches that provide signals when the gates are completely up and completely down, a "pan sync" signal which is transmitted periodically when elevator 10 is operating, a brake engaged limit switch which sends a signal to inform microcomputer 154 when a conveyor brake is actually engaged and disengaged, and transducers for monitoring the speed of elevator 10. Although there are numerous ways to obtain speed information, one particular exemplary way is to count the teeth in a reduction gear located in the coupling train between the hydraulic pump and the conveyor chain drive. Simply by counting the number of teeth, knowing the reduction ratio, and dividing by the time interval, direct speed information can be obtained by the computer. Also, by using the tooth count, a particular pan location on elevator 10 can be accurately determined and kept account of by microcomputer 154. This is also discussed in greater detail hereinbelow.

Figure 4:
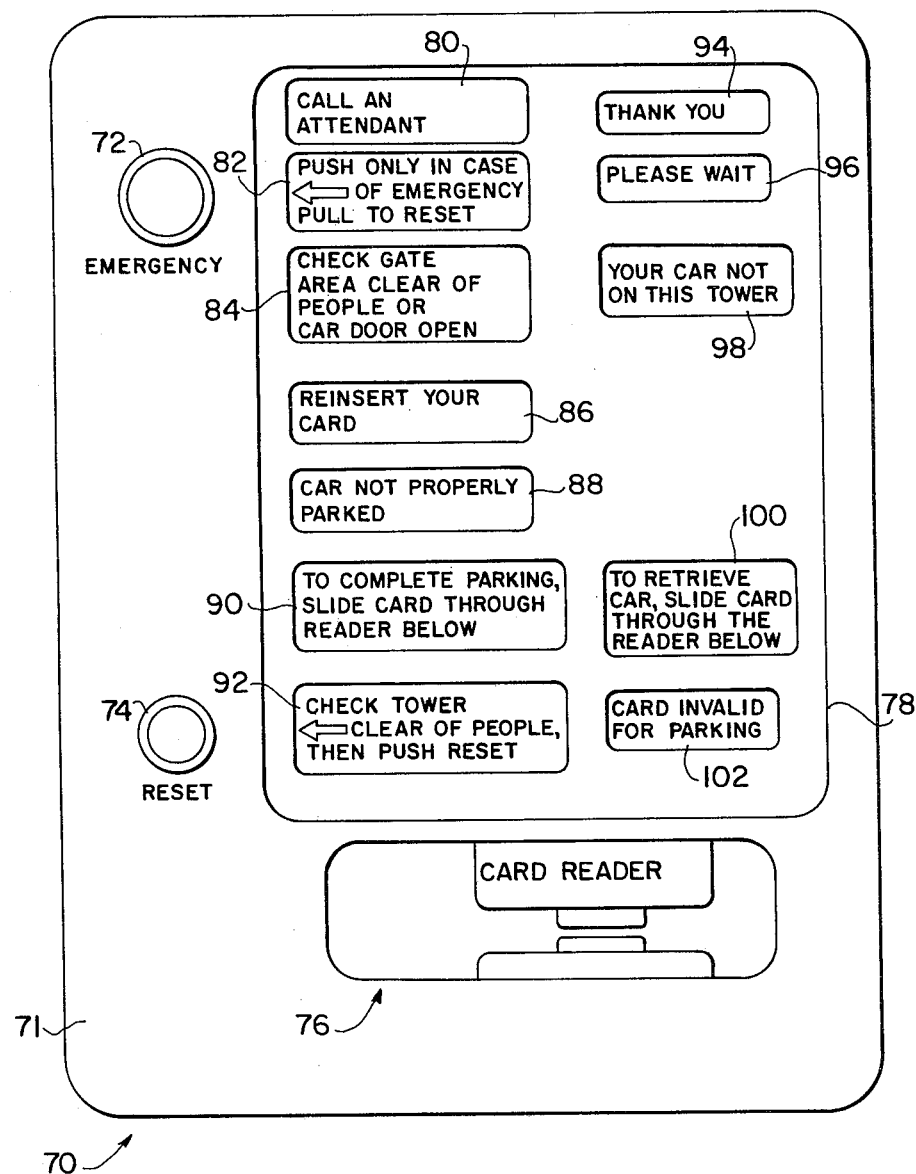
FIG. 4 is a diagrammatic view of the outside panel of a control panel used to operate the elevator in the automatic mode of operation.
Figure 5:
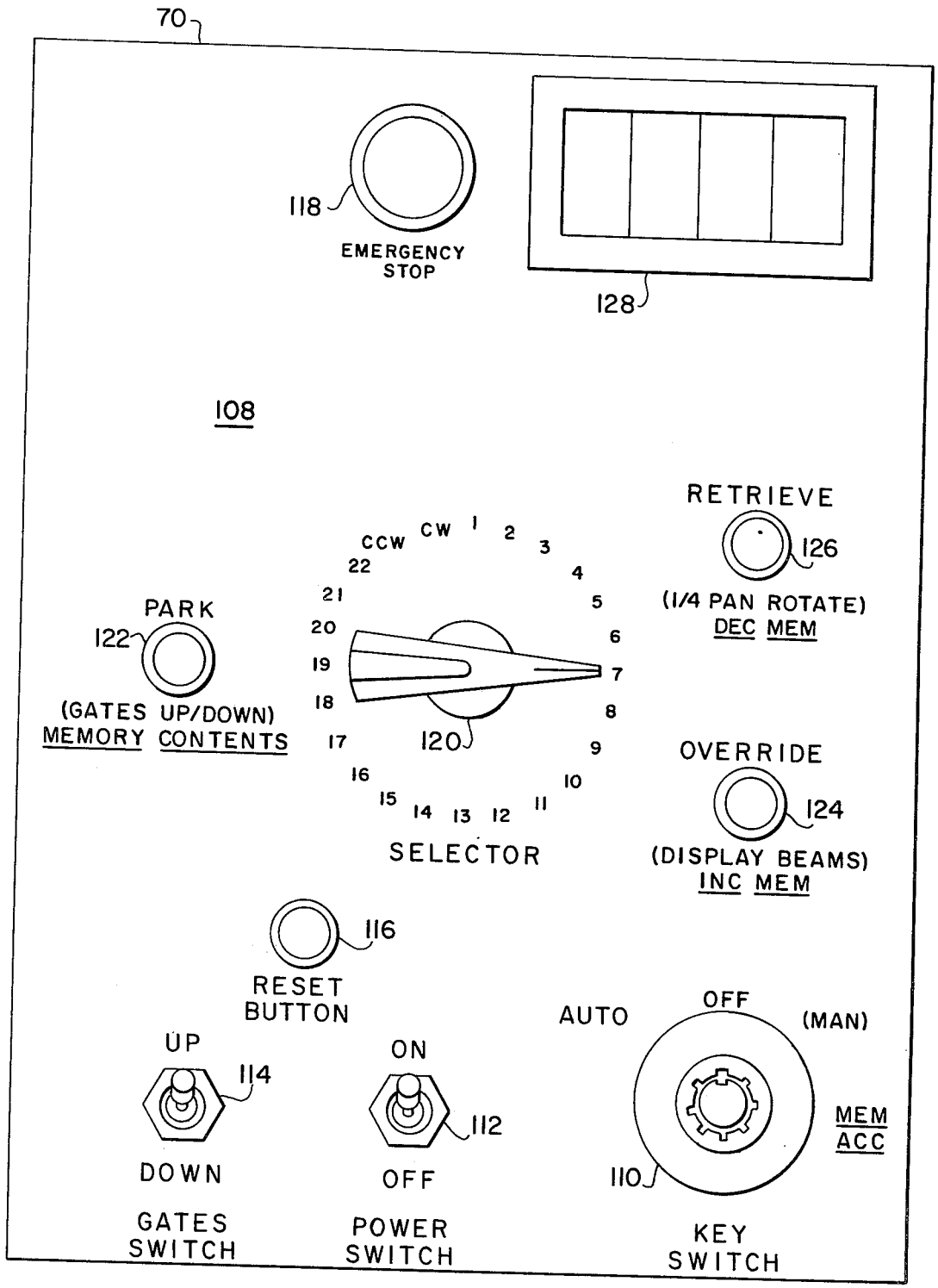
FIG. 5 is a diagrammatic view of the interior panel of the control panel depicted in FIG. 4.

As mentioned above, the particular 6100 microprocessor of microcomputer 154 has provision for a control panel so that manual operation and monitoring of microcomputer 154 can be effected. Such a control panel is schematically shown at 184 in FIG. 19. Control panel 182 is described in greater detail hereinbelow with respect to a particular customer control panel 70 (FIGS. 4 and 5). At this time, control panel 182 need only be described as receiving a plurality of control signals from an output port of microcomputer 154 (such as a numerical readout and lighted sign messages) and as transmitting to microcomputer 154 a plurality of commands (such as conveyor operating commands).

In a presently preferred embodiment of a car elevator 10, car elevator 10 is automatically controlled by an operator or customer upon the reading of a control card by a conventional card reader, depicted at 186 in FIG. 19. Preferably, card reader 186 can be a commercially available magnetic card reader such as model MT200 available from MAG-TEK, Inc. of Carson, California. In this way, automatic operation of car elevator 10 can be effected with previously encoded magnetic cards. For example, as explained in greater detail hereinbelow, whenever a magnetic card is inserted in card reader 186, the operating computer program will determine the correct pan 14 to convey to stall 10c. Generally, whenever it is desired to park a car, all that need be done is to again slide a previously coded magnetic card through card reader 186.

Card reader 186 receives both control signals from microcomputer 154 and transmits coded signals to microcomputer 154. The interfacing between card reader 186 and microcomputer 154 is well known in the art and is fully explained in the operating manuals for the particular card reader described hereinabove. To summarize, however, card reader automatically reads the information imprinted on the card and transmits that information together with a start sentinel and a stop sentinel signal in serial format to a buffer register which latches the information. As soon as the information is latched in the buffer register, a data ready line goes high to indicate that the information is ready to be received by the microcomputer 154.

The final element of conveyor operating system 152 in the presently disclosed embodiment, is the surveillance system mentioned above which is comprised of a plurality of beams. The electronic apparatus for producing and monitoring the surveillance beams are diagrammatically depicted at 188 in FIG. 19. Output signals are provided by microcomputer 154 to turn the transmitter and detector of a particular beam on. As explained later hereinbelow, the beams are monitored through the interrupt routine and the status of the beams are kept in a beam word that is updated two beams at a time. In this particular interrupt routine, the status of a pair of beams is determined, the electronics for those beams is turned off, and the electronics for the next set of beams is turned on to generate those beams during the next interrupt cycle. With this approach, sufficient time is provided for the electronics and the beams to have become stabilized. With this approach, all the computer program must do whenever the status of the beams is desired is to read the beam word constantly kept updated in memory. Obviously, this procedure avoids the time consuming input/output operations utilized by those computer programs that do not use an interrupt routine.

Figure 2:
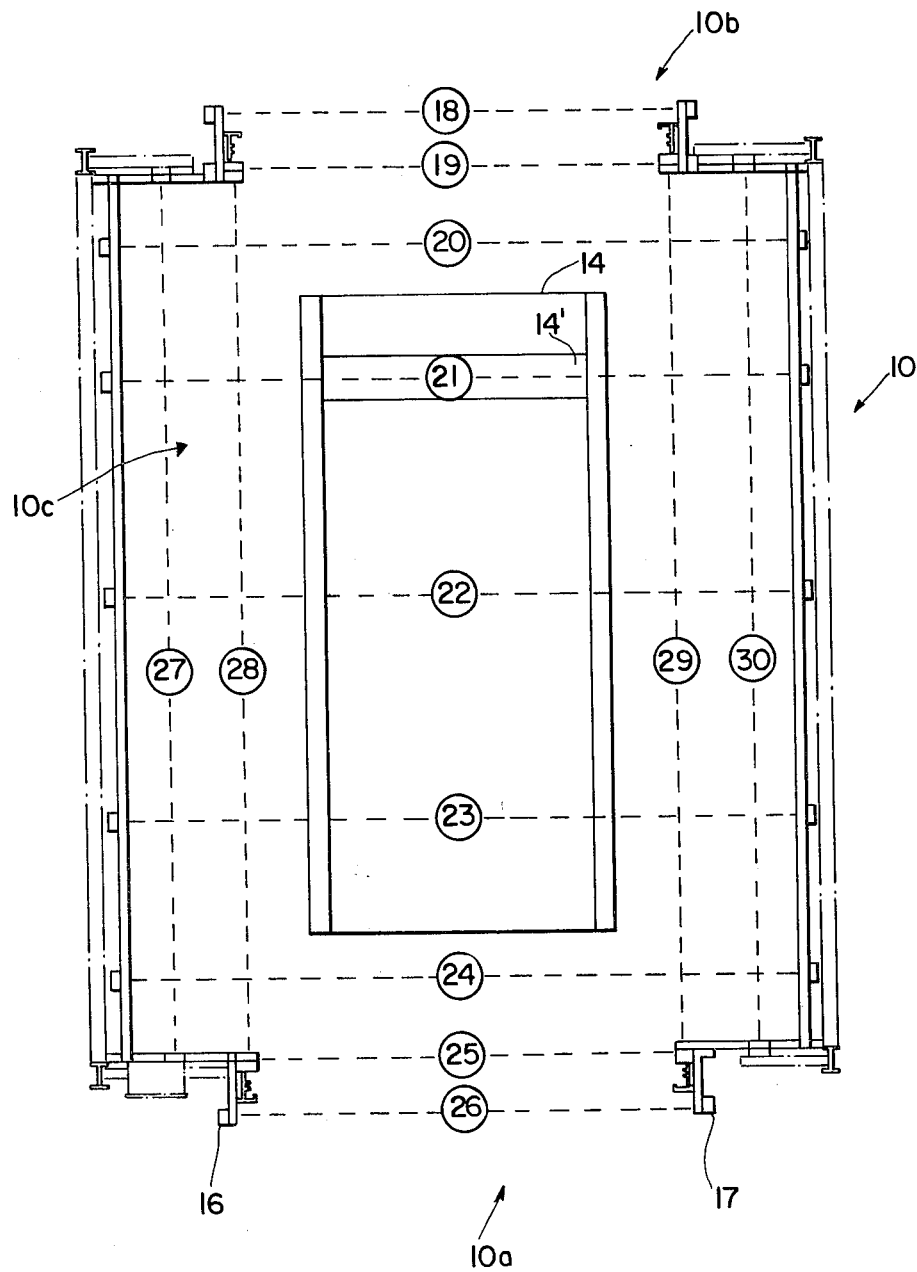
FIG. 2 is a plan elevational view in diagrammatic form of the stall area inside the base of the elevator depicted in FIG. 1 and particularly showing the location of the thirteen surveillance beams used to survey the protected area.

With reference to FIG. 2, there are depicted 13 detection means, each having a source 16 and a detector 17 which emit and monitor a corresponding beam. The 13 beams are strategically located in stall 10c so as to not only detect the presence of an object therein, but also to distinguish the identification of the object and the direction of movement of the object. The beams are denoted 18 through 30 and are preferably located about 30 inches above the ground level. With the exception of beam 21, described further hereinbelow, all of the beams are directed horizontally straight across stall 10c so as to traverse the entire length or width, as appropriate.

Beams 18 and 19 and beams 26 and 25 respectively monitor the exit and entrance of a two-gate elevator 10. Obviously, if elevator 10 has only one gate, one set of beams could be eliminated and their functions performed by the other set of beams. Beams 18 and 19 and beams 26 and 25 detect the exiting and entering, respectively, of a vehicle or the entering or exiting of people. In the computer program, discussed hereinbelow, which is used to operate the car elevator 10, beams 18 and 26 and beams 19 and 25 are used to set or clear software lockouts, the condition of which is used to keep track of people and vehicles inside stall 10c.

Beams 20 and 24, which can be considered to be optional, are used to supplement entrance beams 25 and 26 and exit beams 18 and 19 for determining the direction of movement and the difference between a person and a vehicle. Beam 24 is located at entrance 10a between the rearward end of a conveyor pan 14 located in stall 10c and beam 25. Beam 20 is located at exit 10b between the forward end of conveyor pan 14 and beam 19. In order to distinguish between the presence of a vehicle or a person, a vehicle is determined if both beams 24 and 25 are simultaneously broken, whereas a person is determined if only one beam of beams 24, 25, and 26 are broken at a time. In addition, if a parking tower 10 uses the same end as both the entrance and the exit, then the order in which beams 24, 25, and 26 are broken are used to indicate if the moving object is entering or leaving stall 10c, simply by the order in which the beams are broken.

The other beams have the following functions. Beams 24 and 20 are transverse beams and are located intermediate the corresponding end of pan 14 and beams 25 and 19, respectively. Beams 24 and 20 can be used to indicate when a vehicle which is parked on pan 14 is too long and in some cases when a vehicle is improperly parked. In addition, as mentioned above, when used in combination with beams 25 and 26 or 19 and 18, respectively, beams 24 and 20 can be used to indicate the direction of movement of an object inside stall 10c and to determine whether the object is a person or a vehicle. Finally, beams 24 and 20 can be used to indicate the presence of a person inside stall area 10c and upon such detection to prevent the operation of car elevator 10.

Two pairs of longitudinally travelling side beams, beams 27 and 28 and beams 29 and 30, are respectively located on corresponding sides of pan 14 and are used in conjunction with beams 20 and 24 to monitor the interior of stall 10c. In addition, beams 28 and 29 are located close enough to pan 14 so that an open door of a vehicle parked on pan 14 can break the corresponding beam; providing however, that the vehicle is not parked on pan 14 too far away from the corresponding beam.

Three additional, transversely travelling beams, beams 21, 22, and 23, monitor pan 14 and detect the presence of a vehicle thereon. In addition, beams 21 and 23 can be used for determining the direction of travel of a vehicle either entering pan 14 or leaving pan 14. Finally, beam 21 has the additional function of monitoring a wheel well 14' located in pan 14 to determine whether the vehicle is properly positioned on pan 14 with the wheels thereof in wheel well 14'. Wheel well 14' can simply be a recessed area in an otherwise substantially horizontal surface of pan 14.

As mentioned above, all beams with the exception of beam 21 preferably travel in a horizontal direction parallel to the ground. An exemplary installation of all beams except beam 21 would have the beams extend between 24 inches to 30 inches above the ground.

In a presently preferred embodiment of the invention, all beams with the exception of beam 21 are infrared beams in the nonvisible light spectrum. Beam 21 in this presently preferred embodiment is a microwave beam that is aimed to bounce off the center of pan 14 from a transmitter and to be received at an appropriately positioned receiver. Microwave beams are ideally suited for this purpose because of the reflectivity to microwaves of the metal with which pan 14 is constructed. By having a relatively shallow incident and reflection angle, beam 21 can be used to accurately determine the proper positioning of the vehicle wheels in wheel well 14'.

As an example of how the breaking of the beams is used to determine whether the object is a vehicle or a person and whether the object is entering or leaving stall 10c, assume the following sequence occurs. From a condition where no beams are broken, first beam 26 is broken; then both beams 26 and 25 are broken; then beams 26, 25, and 24 are broken; then beams 25, 24, and 23 are broken, and beam 26 is not broken; and finally only beams 23, 22, and 21 are broken. This sequence would indicate that a vehicle has entered the stall 10c area, and has been driven onto and properly parked on conveyor pan 14.

Beams 18 through 30 preferably have an accurately generated, modulated frequency. The beams are also preferably controllable so that they can be selectively turned on and off and can be selectively monitored for being broken or unbroken by an automatic control system. One such automatic control system could be a digital computer and more particularly a microprocessor controlled computer system. Such a system is quite inexpensive, programmable and usable for performing a number of other functions, such as controlling the operation of car elevator 10.

Figure 3:
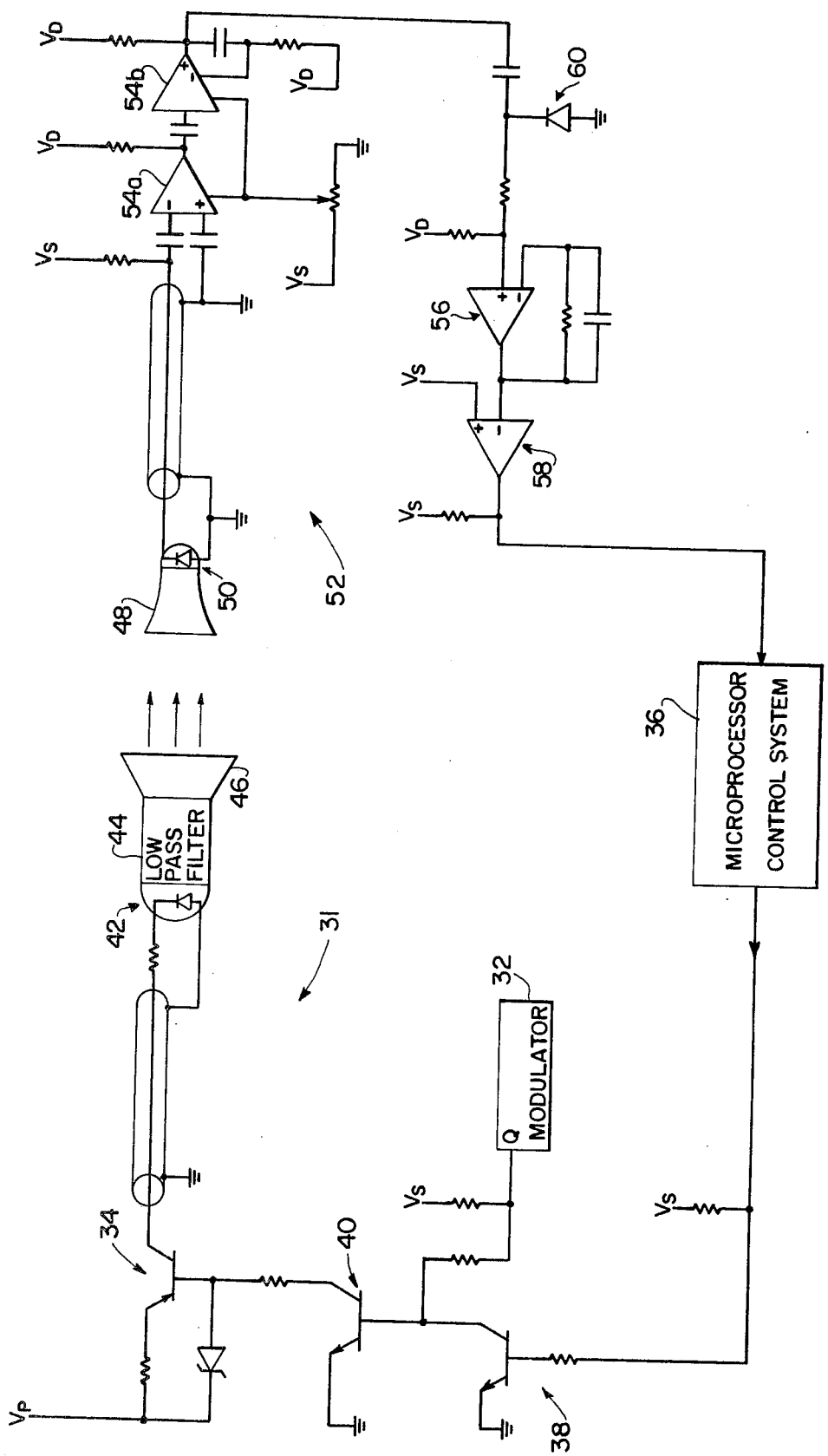
FIG. 3 is an electrical schematic diagram showing an electronic circuit for selectively operating and receiving a microwave beam generating apparatus.

A microprocessor controlled system for generating and detecting microwaves which can be emitted by source 16 and detected by detector 17 is depicted in FIG. 3. An impatt diode oscillator 31 is used to produce 50 milliwatts of 10 GHZ microwave radiation which is amplitude modulated by a modulator schematically shown at 32 by switching a constant current driver 34 on and off at a desired modulation frequency, an exemplary frequency being 5 KHz. Modulator 32 can simply be a properly wired IC (integrated circuit) No. 74123 and an exemplary transistor driver that can be used for driver 34 is a 2N5415 type transistor. A microprocessor control system 36 is coupled in parallel with modulator 32 to driver 34 with grounded emitter, coupling transistors 38 and 40. Coupling transistors 38 and 40 can be, respectively, of the types 2N5172 and 2N3440. The output of driver 34 is connected to an impatt diode 42 which, when conducting current produces the desired microwave radiation. The output of impatt oscillator 31 is passed through a low pass filter 44 to eliminate the higher harmonics and then transmitted through a conventional 18 dB gain X-band horn 46 toward a receiving horn 48 which is also an 18 dB horn having the same polarity.

The use of a modulator in oscillator 30 has at least two purposes. First, a modulator makes the microwave beam much easier to detect because the band width of the receiver can be constructed around the modulated frequency, thereby reducing receiver noise levels. The second purpose is to permit easy isolation of a plurality of microwave beams in one system from those of a nearby system by simply using different modulation frequencies. High gain horns are used to reduce the necessary system power requirements and to eliminate interference between separate beams.

Receiver horn 48 has a crystal detector 50 mounted thereon and which is maintained at a slight positive bias with a receiver circuit 52 so as to provide maximum sensitivity. Receiver circuit 52 has approximately a 60 dB gain which can be internally adjusted and comprises a pair of dual operational amplifiers 54a and 54b with automatic gain control. Operational amplifiers 54a and 54b can be the conventional 757 DM type dual operational amplifier. From the output of operational amplifier 54b, the received signal is sent first through a current amplifier 56 (for example of the type MC3301P) and thence to a impedance matching amplifier 58 that has TTL output compatability (for example of the type MC33129). Amplifiers 56 and 58 together with the depicted capacitors, resistors, and a diode 60 act as a Schmitt trigger to detect, filter and convert the received signal to a standard output TTL logic signal which is then fed to the microprocessor control system 36 to be decoded and interpreted.

The operation of the microwave detection system is as follows. Source 16 of polarized microwave radiation is aligned and positioned opposite detector 17 which can only detect the same polarized electromagnetic radiation having the same modulation. If a beam is broken by either a person or a vehicle, detector 17 is unable to sense the microwaves emitted from source 16. Assuming that microprocessor control system 36 has been properly programmed, the initial reception of microwave radiation and the subsequent termination thereof is detected and interpreted as described in greater detail hereinbelow.

Figure 10:
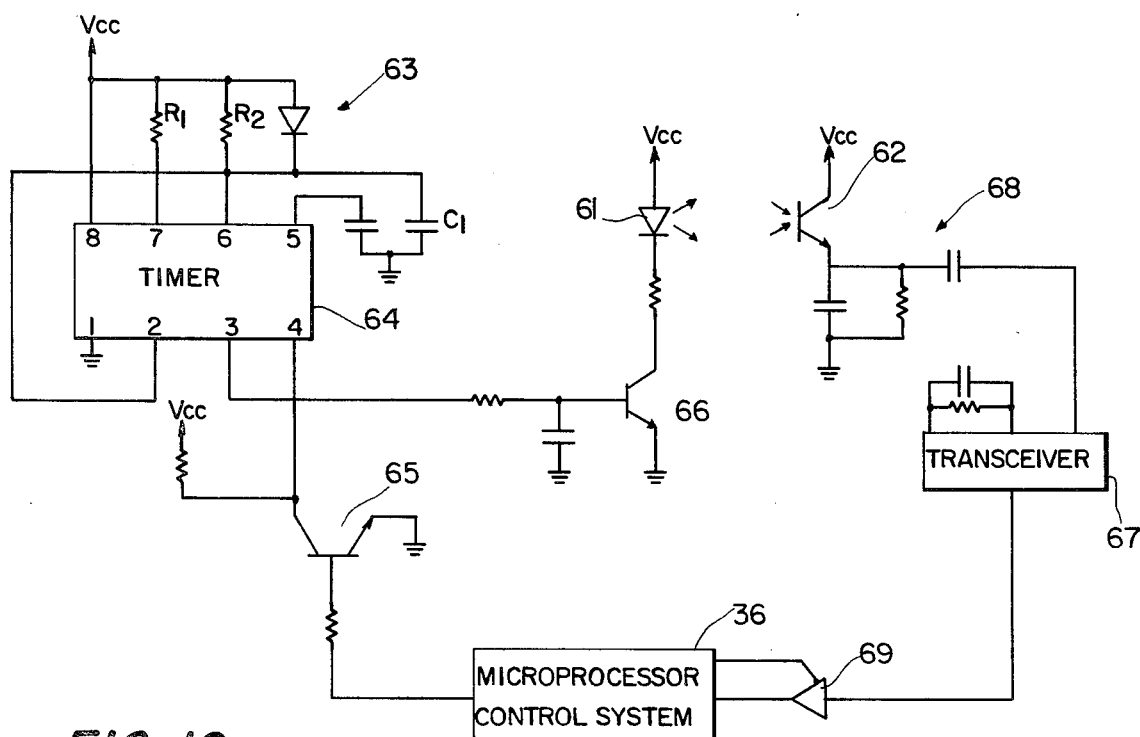
FIG. 10 is an electronic schematic diagram for operating an infrared beam system usable with the present invention.

With reference now to FIG. 10, a microprocessor control system for generating and detecting infrared light beams which can be emitted by source 16 and detected by detector 17 is depicted. Microprocessor control system 36 controls the generation of an infrared light electromagnetic radiation beam from a light emitting diode 61 and the reception of the beam by a matched phototransistor 62. Diode 61 is modulated by a gated oscillator circuit 63 to emit the infrared radiation at a relatively high frequency, for example, 25.5 KHz. Gated oscillator 63 can be, for example, a commercially available integrated circuit timer connected for an astable operation so that it retriggers itself and free runs as a multivibrator. Timer 64 can be, for example, an LM555 integrated circuit whose eight pins are connected as depicted in FIG. 10. The duty cycle of timer 64 can be accurately set through the ratio of resistors $R_1$ and $R_2$ and the frequency can be accurately determined by resistors $R_1$ and $R_2$ as well as by capacitor $C_1$. The reset line of timer 64 (connected to pin 4) is used to gate the operation of gated oscillator 63. A control output signal from microprocessor control system 36 is transmitted through a conventional NPN transistor wired as an emitter follower to pin 4 of timer 64. The output from gated oscillator 63 is taken from pin 3 of timer 64 and used to gate a conventional switching transistor 66 that is connected, in turn, in series with photodiode 61. Thus, photodiode 61 will emit an infrared signal having the frequency of oscillator 63 when oscillator 63 is gated on by microprocessor control system 36.

The transmitted infrared radiation is detected by phototransistor 62. The detection circuit is principally comprised of a transceiver integrated circuit 67, such as an LM1812 device manufactured by National Semiconductor Corporation. The signal from phototransistor 62 is coupled through a filter 68 to transceiver 67. Filter 68 is comprised of an RC network to attenuate noise and high frequency and a coupling capacitor to eliminate any DC signal. Transceiver 67 is connected up in a free running oscillator mode through the use of a matched RC network so as to oscillate at exactly the same frequency as gated oscillator 63. The output from transceiver 67 is sent to microprocessor control system 36 through a gated buffer 69. Buffer 69 can be a conventional Hex Tri-state buffer integrated circuit No. 80C97. Thus, the signal received from phototransistor 62 can be interrogated by microprocessor control system 36 at any selected time simply by activating buffer 69.

The beam receiver circuit is tuned to and synchronized with the oscillating frequency of the beam transmitting circuit by having the latter act as a master and the former as a slave. Thus, the transmitted frequency is used by the receiving circuit to start the receiving circuit oscillating. For example, in FIG. 10, a parallel inductor-capacitor pair are connected between $V_{cc}$ and the appropriate connection of the transceiver integrated circuit. This LC circuit is tuned to the transmitted frequency and when the receiver frequency, once activated, is synchronized with the transmitted frequency, the LC pair presents an extremely low impedance and permits the receiver circuit to oscillate at the same frequency as transmitted in synchronization therewith.

If necessary, further isolation of the transmitted microwave or infrared beams from either the same system or a similar system used on an adjacent car elevator 10 can be obtained by using the microprocessor to either selectively generate the beams or to selectively sample the generated beams. Because the systems of FIGS. 3 and 10 use modulated radiation, a greater number of beams can be sampled without interference between the beams simply by using different modulation frequencies for the beams of different car elevators 10.

Although the detection means has been described with respect to particular types of electromagnetic radiation, it would be obvious that any other type of electromagnetic radiation such as radio waves, visible light radiation, and laser beam radiation, could also be utilized. In addition, non-electromagnetic radiation such as ultrasonic sound radiation could also be utilized.

The particular operation of the conveyor control system will now be described with respect to a particular, presently preferred embodiment. Referring to FIGS. 4 and 5, the external and internal controls and displays of a customer control panel are respectively depicted. Control panel 70, as shown in FIG. 4, has a front face 71 that contains an emergency button 72, a reset button 74, and a card reader 76, which can be the same as card reader 186 discussed with respect to FIG. 19. Front face or panel 71 also contains a legend area 78 that contains twelve legends, numbers 80–102, which are backlighted and selectively displayed in response to lighting the associated lamp (not shown) by signals produced by the microcomputer system.

With particular reference to FIG. 5, the inside of control panel 70, or the inside panel 108 thereof, contains a number of computer controls that are preferably available only to a knowledgeable operator and not to the general public. The set of buttons and switches permits the operator to control all of the actions of car elevator 10 through the microcomputer. It also permits the operator to read the information stored at any selected memory location. The controls include a key operated switch 110, a power switch 112, a gate switch 114, a reset button 116, an emergency stop button 118, a pan selector switch 120, and three multi-purpose push-button switches A, B, and C, respectively denoted 122, 124, and 126. The particular function performed by the multi-purpose push-buttons depend upon the position of key switch 110. Finally, a numeric BCD output display 128 is provided to permit the display of operational and error codes or the display of data in memory depending upon the position of key switch 110.

Control panel 70 provides the operator with three individual modes of operation which are selected by the position of key switch 110. Each mode of operation is indicated by using words in large letters, by using words having a smaller size in parentheses, and by using words having a smaller size that are underlined. Only those switches which correspond in lettering to the mode selected by key switch 110 are operable when key switch 110 is in that mode. The modes of operation are the automatic or AUTO mode, the manual or MAN mode, and the memory access or MEM ACC mode. The automatic mode of operation is used to park and retrieve vehicles through the use of the card reader or by individually selecting pan numbers and using push-button switch 126. The manual operation is used primarily for maintenance purposes by a trained operator. This mode permits the operators to have a greater degree of control over the operation of elevator 10. Finally, the memory access mode is used by maintenance personnel to help diagnose problems with elevator 10 or with conveyor operating system 152.

Finally, key switch 110 is provided with an off mode. In this mode, electrical power is disconnected from the electronic control circuits and the control box is inoperative until another mode is selected.

The operation of the various switches on inside panel 108 will now be described for key switch 110 selecting the automatic mode. Push-button switch 122 in this mode is the PARK switch and a car may be parked without a magnetic card simply by pressing the switch. Upon pressing the switch, operating system 152 will cause the gates to close and the car elevator to rotate the pans until an empty pan is left at the bottom.

Push-button 126 is the RETRIEVE switch when key switch 110 selects the automatic mode and permits an operator to retrieve a pan selected by pan selector switch 120. As soon as push-button 126 is depressed, the gates will close and the elevator pans will rotate until the selected pan is on the bottom. It is noted that the CW or clockwise position and the CCW or counterclockwise position will have no effect when key switch 110 selects the automatic mode.

Push-button switch 124 is the OVERRIDE switch in the automatic mode and permits the operator to override the effect of the beam surveillance system described hereinabove. Usually this switch is used in conjunction with switch 122 or 126 to respectively park or retrieve a desired pan.

Gate switch 114 is normally in the UP position permitting the gates of elevator 10 to be up while awaiting a customer to park a vehicle. Access to stall 10c can be denied for security or repair purposes with gate switch 114 in the DOWN position. Normal operation is resumed by returning gate switch 114 to the UP position which will then permit operating system 152 (FIG. 19) to raise the gates.

Power switch 112 is another means for permitting an operator to de-energize the operating system 152 whenever car elevator 10 is not being used. This could occur, for example, if this particular operator had access to inside panel 108 but did not have a key to operate key switch 110.

In the manual mode with key switch 110 positioned to the MAN position, inside panel 108 permits an operator to use the controls for maintenance and repair of elevator 10. In this position, push-buttons 122, 124, and 126, have the functions designated in parentheses and the beam surveillance system is inoperative. Switch 114 when used in conjunction with push-button switch 122 being held in permits the positioning of the gates to any desired position. However, the gates will not move unless the push-button switch 122 is depressed and held in. Pans 14 can be positioned to any desired position by rotating pan selector switch 120 to either the CW or the CCW position. However, through a computer program interlock, the car elevator 10 will not operate until the gates are first lowered. Pans 114 begin rotating upon the depression of push-button switch 126 and stop rotating upon the release thereof. Finally, push-button 124 when depressed will cause the display of a coded number to indicate all of the beams which are blocked. If all of the beams are working correctly, the display in display 128 will be all zeros. Otherwise, the display will be in binary coded decimal and will have to be decoded to determine the particular beam that is blocked and hence malfunctioning.

When the memory access mode is selected, reset button 116 resets the memory address counter to zero and push-buttons 124 and 126 when depressed can be used to increment and decrement the memory address, respectively. When push-buttons 124 and 126 are released, display 128 will indicate the current address of memory being addressed. The contents of that memory address are displayed by display 128 when push-button 122 is depressed.

Emergency stop push-button 118 and emergency push-button 72 (FIG. 4) have the same purpose and permit the stopping of elevator 10 at any time. As a result of the computer program, if either emergency push-buttons are depressed while elevator 10 is stopped, the elevator can be operated again simply by depressing reset button 116 or reset 74 (FIG. 4). However, the reset switches 74 and 116 will have no effect if the emergency switches 72 and 118 are depressed while the elevator is operating.

Figure 6:
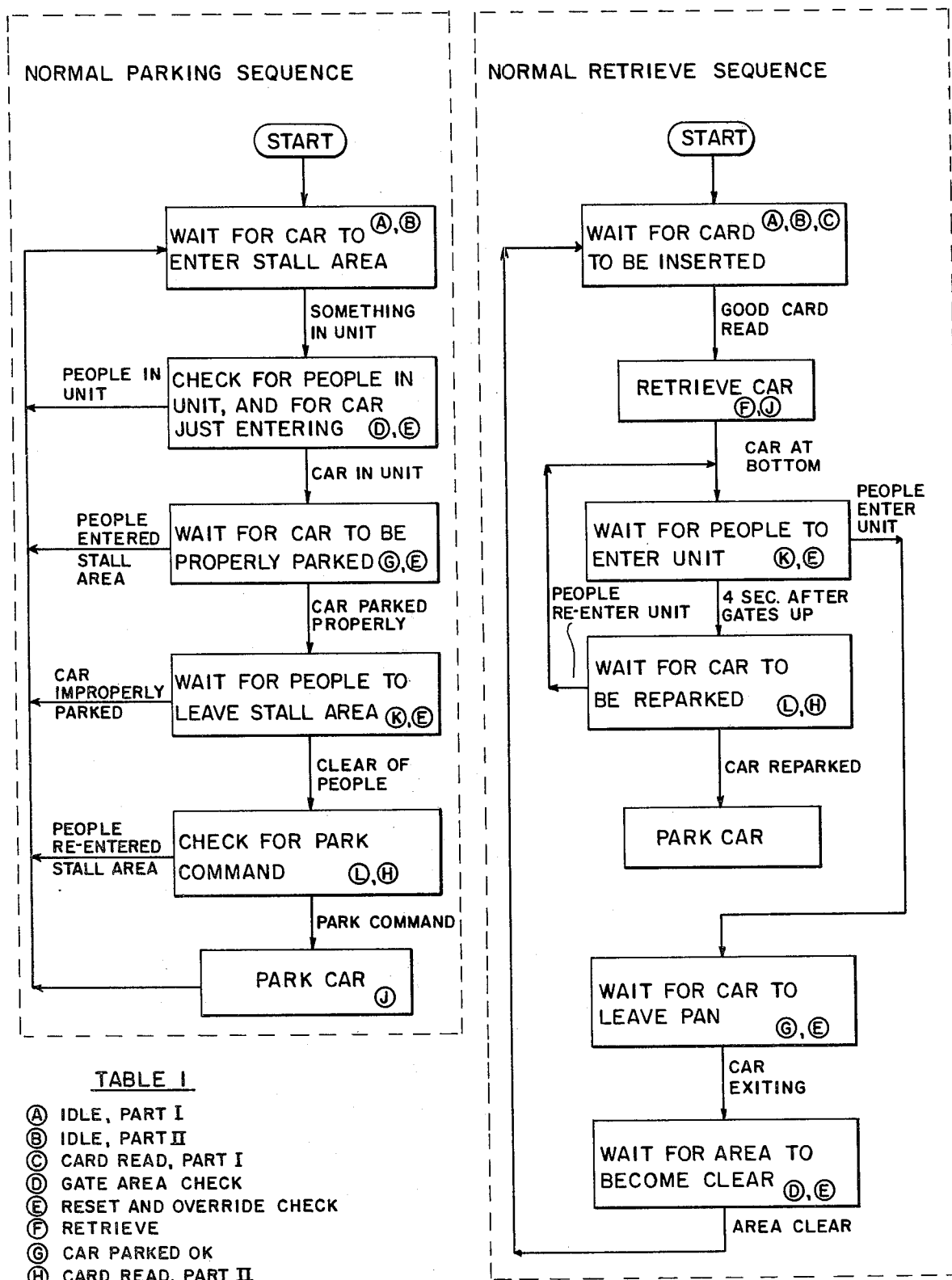
FIG. 6 is a generalized flow diagram illustrating the normal parking sequence and the normal retrieve sequence of a conveyor operating system according to the present invention.
Figure 7A:
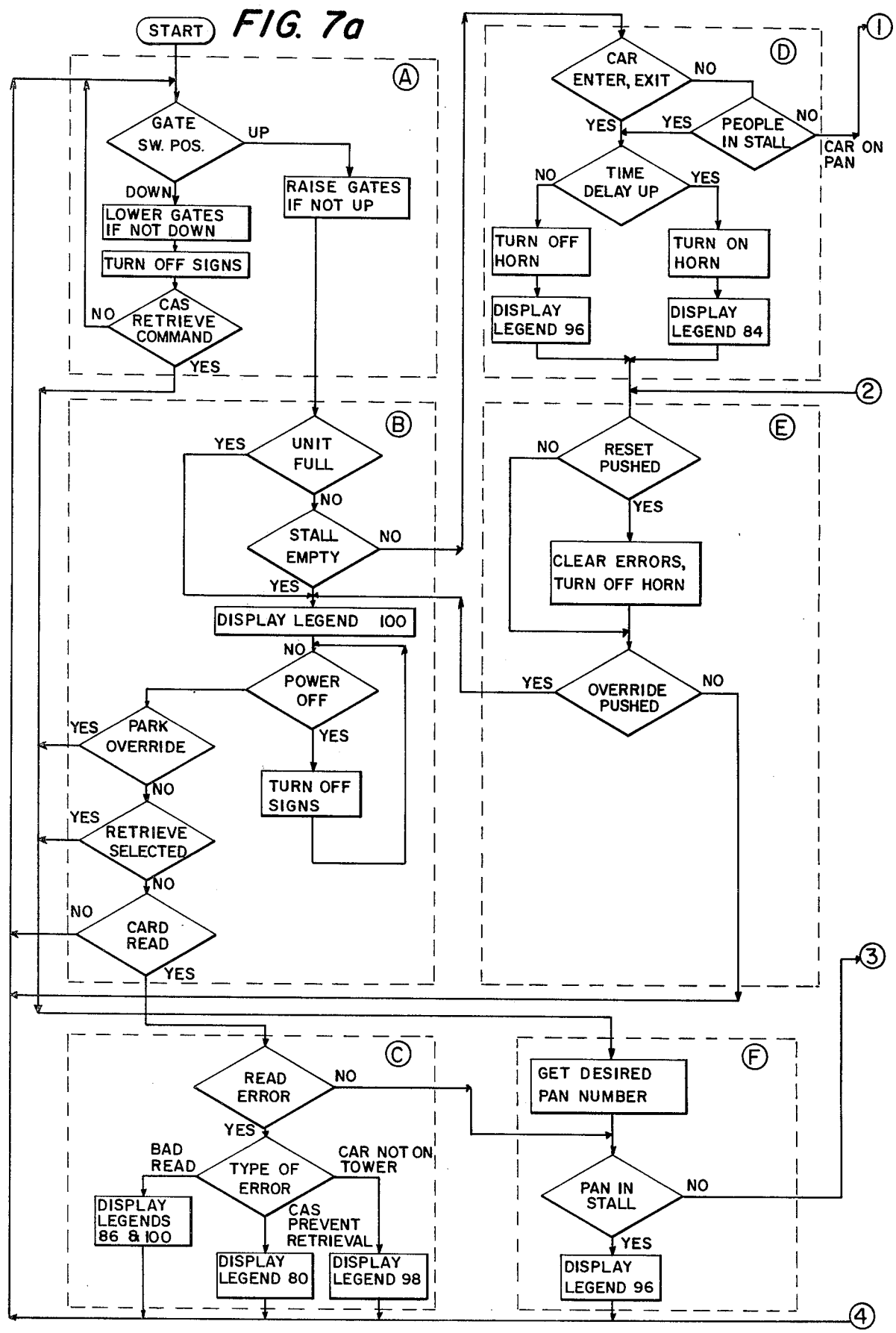
FIGS. 7a and 7b are a more detailed flow diagram showing the operation of the conveyor operating system according to the present invention.
Figure 7B:
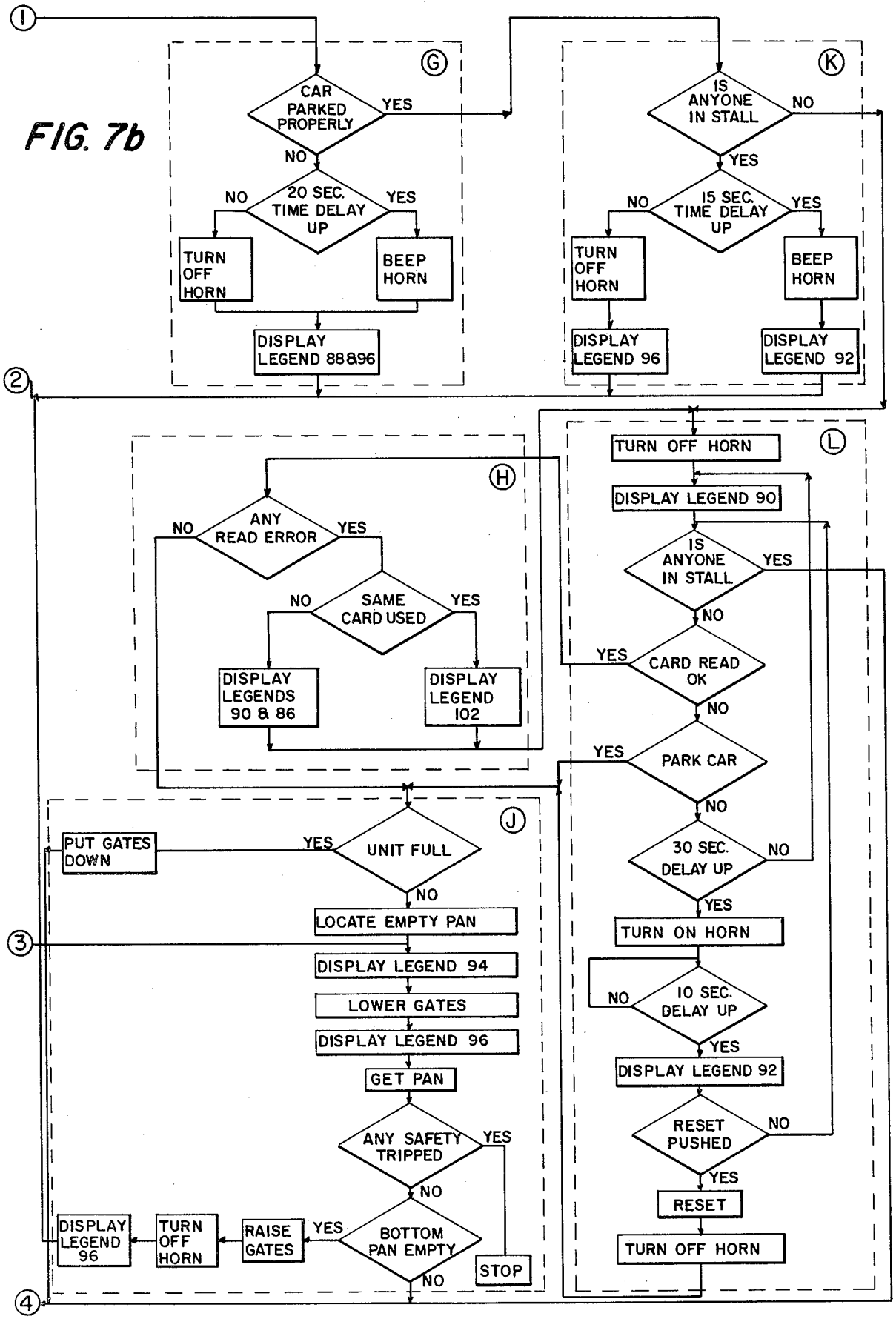

A normal parking sequence and normal retrieve sequence of conveyor operating system 152 will now be explained with particular reference to FIGS. 6 and 7 through a discussion of the legends 80–102 of FIG. 4.

When conveyor operating system 152 is in the quiescent or idle state, with key switch 110 selecting the automatic mode of operation, legend 100 will be displayed. When this legend is lit, the surveillance system has not detected any people or any vehicles within stall 10c at the bottom of elevator 10 and the operating system is waiting for someone either to park or to retrieve a vehicle. This is the normal idle condition. An empty pan 14 is positioned at the bottom of elevator 10 and the gates are up unless elevator 10 is full. If elevator 10 is full, a "full sign" (not shown) is lit, the gates are down blocking access to stall 10c, and none of the legends are displayed on panel 71.

If legend 80 is illuminated, the tower cannot be run in the automatic mode of operation because a safety device has detected an error condition. The warning horn should be beeping for most error conditions and can only be silenced by operating key switch 110 to the OFF position. Finally, should legend 92 be illuminated, the warning horn will also beep and will continue until the reset button 74 is depressed. If a vehicle is on a bottom pan 14, that pan will be parked upon the depression of reset push-button 74 assuming no disabling error condition or safety has been activated.

In the normal parking sequence, the gates are up and the customer wishing to park his or her vehicle only has to drive it into the waiting pan 14. As soon as a surveillance beam is broken, legend 96 is displayed. Should a vehicle driven into stall 10c and onto the waiting pan 14 not be parked properly such that the front wheels thereof rest in wheel well 14', legend 88 is displayed.

As soon as all occupants have exited from stall area 10c, and stall 10c is clear except for a properly positioned vehicle on pan 14, legend 90 is displayed instructing the customer to slide his or her card through reader 76. As soon as a card is properly read by card reader 76, the gates are closed and the pans 14 are rotated until an empty pan is left on the bottom of elevator 10. Should, however, a card be read incorrectly, legend 86 is displayed instructing the customer to reinsert the card. If a card has already been used before for parking a vehicle on the tower, the card is invalid for parking a second car. Should an attempt to use a card to park two cars, however, legend 102 is displayed and elevator 10 remains inactive. Legend 92 is displayed whenever a vehicle is properly parked on pan 14 and a surveillance beam is broken. A surveillance beam could be broken by either an open car door or people within stall 10c, entrance 10a, or entrance 10b. A properly read card will cause legend 96 to be illuminated while the gates are being closed and the pans 14 are being rotated. After a car has been properly parked, legend 94 is illuminated for a short period of time until an empty pan is positioned at the bottom of the tower and the gates are opened, whereupon legend 100 is illuminated.

Legend 82 is illuminated whenever elevator 10 is operating as a reminder to the customer that the emergency button 72 can be pushed to stop the operation of elevator 10. Whenever push-button 72 is depressed, elevator 10 will stop rotating pans 14 and the gates will automatically open to allow access to the interior.

As mentioned above, legend 100 is displayed whenever elevator 10 is in the idle condition. As soon as a customer having a vehicle on elevator 10 slides his or her card through card reader 76 and the card is properly read, the gates close and pans 14 rotate until the appropriate car is located on the bottom of elevator 10. Should, however, a card be used on the wrong tower, legend 98 will display to indicate that a vehicle is not parked by that particular card. Legend 102 will be displayed if one vehicle is attempted to be retrieved while another vehicle is at the bottom of elevator 10 and has not been parked as described hereinabove. If a vehicle remains at the bottom without being parked for a predetermined length of time, legend 92 will be displayed and the car can then be parked by anyone upon the depression of reset push-button 74.

As soon as a card has been read correctly, legend 96 will be displayed while the gates are closing and the pans 14 are rotated to bring the indicated car to the bottom of the tower. After a vehicle has been retrieved, that same vehicle can be again parked simply by repeating the parking sequence described hereinabove.

Figure 8:
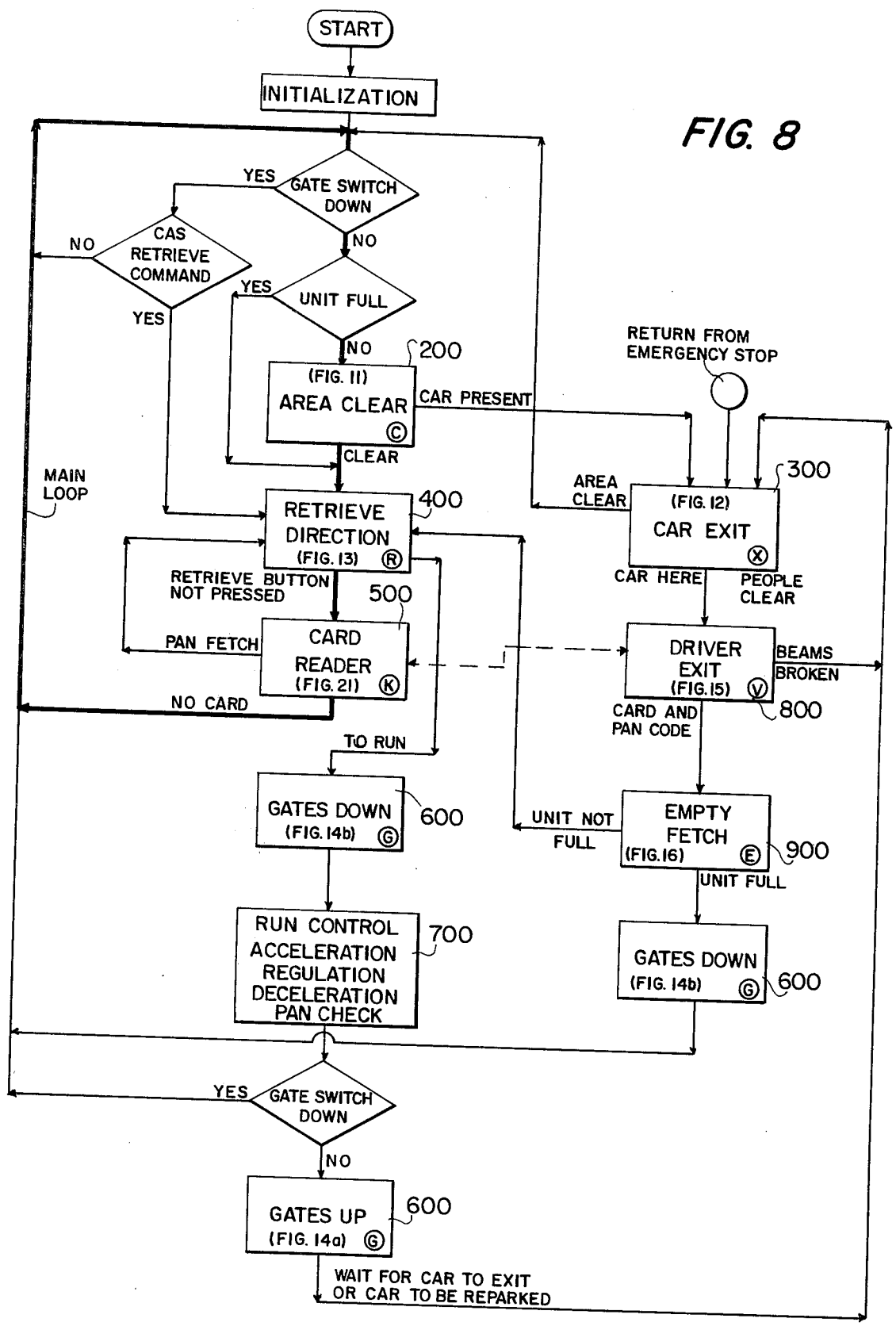
FIG. 8 is a generalized flow diagram of a particular embodiment of a computer program broken down into the various sub-routines thereof which is used to operate a general purpose digital computer according to the present invention.

With reference now to FIG. 8, a flow diagram of the various subroutines used during the normal operation of microcomputer 154 is depicted. As described hereinabove, the computer program is interrupt driven and operates within a plurality of individual subroutines. A good understanding of the program flow and message used in the computer control system can be obtained from a discussion of FIG. 8 using the previous discussion of operation of the system as a basis.

Normally, initialization of the system is entered only when the unit is powered up or when key switch 110 is switched from the off mode to the automatic mode of operation. The function of the initialization subroutine is to initialize the variables in the system RAM (Random Access Memory), turn off all outputs, and read and interpret a switch register that is used to set the individual system characteristics. Although this switch register is not needed for a full understanding of the present invention, a simplified explanation is that switches are provided to indicate whether the particular elevator 10 has one or two gates, whether only a front or a rear gate is to be operated, whether beam 21 or 23 is used as the wheel wheel beam, the unit speed, and the particular unit number.

The program exits the initialization subroutine and enters the main loop, or the loop which the computer program travels when in the idle state awaiting for a vehicle to enter elevator 10 or a parked vehicle to be retrieved. The main loop consists of two initial decision boxes to ascertain whether the gate switch is down and whether the unit is full. In normal conditions, the answer to both of these questions is "no". From the unit full decision box, the main loop goes through the area clear subroutine 200 to determine whether any beams are broken. If no beams are broken, the computer stays in the main loop and enters the retrieve direction subroutine 400 to ascertain whether a retrieve command has been given by card reader 76 (FIG. 4) or whether retrieve button 126 (FIG. 5) has been pushed. Assuming neither of these events, the program exits the retrieve direction subroutine 400 and goes into the card reader subroutine 500. In card reader subroutine 500 the program checks to see whether the card reader done flag has been set and if not, promptly exits the subroutine to go back to the top of the main loop and start the process all over again.

Area clear subroutine 200 (see also FIG. 11) is entered on only one occasion, when the unit is clear of people and vehicles. When the subroutine is entered, the personnel detection status word or beam word is checked. If no beams are broken, the control passes out of the subroutine and continues in the main loop as discussed above. In the event that a beam is broken, program control stays in area clear subroutine 200 until either the person breaking a beam has left or a car is detected and has been properly positioned on pan 14. If a vehicle is detected and has been properly positioned on pan 14, control passes out of area clear subroutine 200 to the car exit subroutine 300. On the other hand, if a person has been classified as the object breaking the beams, as discussed above, control will exit area clear subroutine 200 whenever the beams are re-established and preset timers have expired. When these conditions occur, the exit taken is the same one as if no beams had ever been broken.

Retrieve direction subroutine 400 (see also FIG. 13) is used to scan retrieve button 126 being depressed and for the central accounting system control word (as described herein below). The program also enters the retrieve direction subroutine 400 from the empty fetch subroutine 900 or the card reader subroutine 500 during the park sequence or whenever a known pan is requested from the use of card reader 186 or by the CAS computer 150.

The primary function of retrieve direction subroutine 400 is to determine which direction is the most expedient one to bring the requested pan 14 to the bottom of elevator 10. In other words, this subroutine is used to determine on which side of elevator 10 the requested pan is located and to select the shortest direction, either clockwise or counterclockwise, to bring the requested pan to the bottom. If the requested pan is located at the very top of the elevator 10, the subroutine defaults to the clockwise direction.

At the exit point of retrieve direction subroutine, the microprocessor accumulator (Acc) contains a value used later on to determine which one of three branches the program takes. If the accumulator equals zero, the retrieve direction subroutine 400 has detected no retrieve request and program control continues in the main loop. If no exiting retrieve direction subroutine 400, the accumulator is equal to a positive number, the requested pan was found to be present at the bottom of elevator 10. Finally, in the case in which the accumulator contains a negative number, the direction word has been set to the proper direction and the unit is ready to begin a run procedure.

It is noted that in most microprocessors, including the 6100 microprocessor used in a preferred embodiment of the present invention, a negative number is determined whenever the most significant bit of the accumulator is a one. Thus, in the case of a 12-bit accumulator as in the 6100 microprocessor, this condition occurs whenever a $7000_8$ number, a $6000_8$ number, a $5000_8$ number, and a $4000_8$ number is stored in the accumulator. The subscript 8 indicates that the 7000, 6000, 5000, and 4000 numbers are written in binary coded octal. Thus, the number $7777_8$ stored in the accumulator in one of the exits from retrieve direction subroutine 400 can be considered a negative number.

Figure 18:
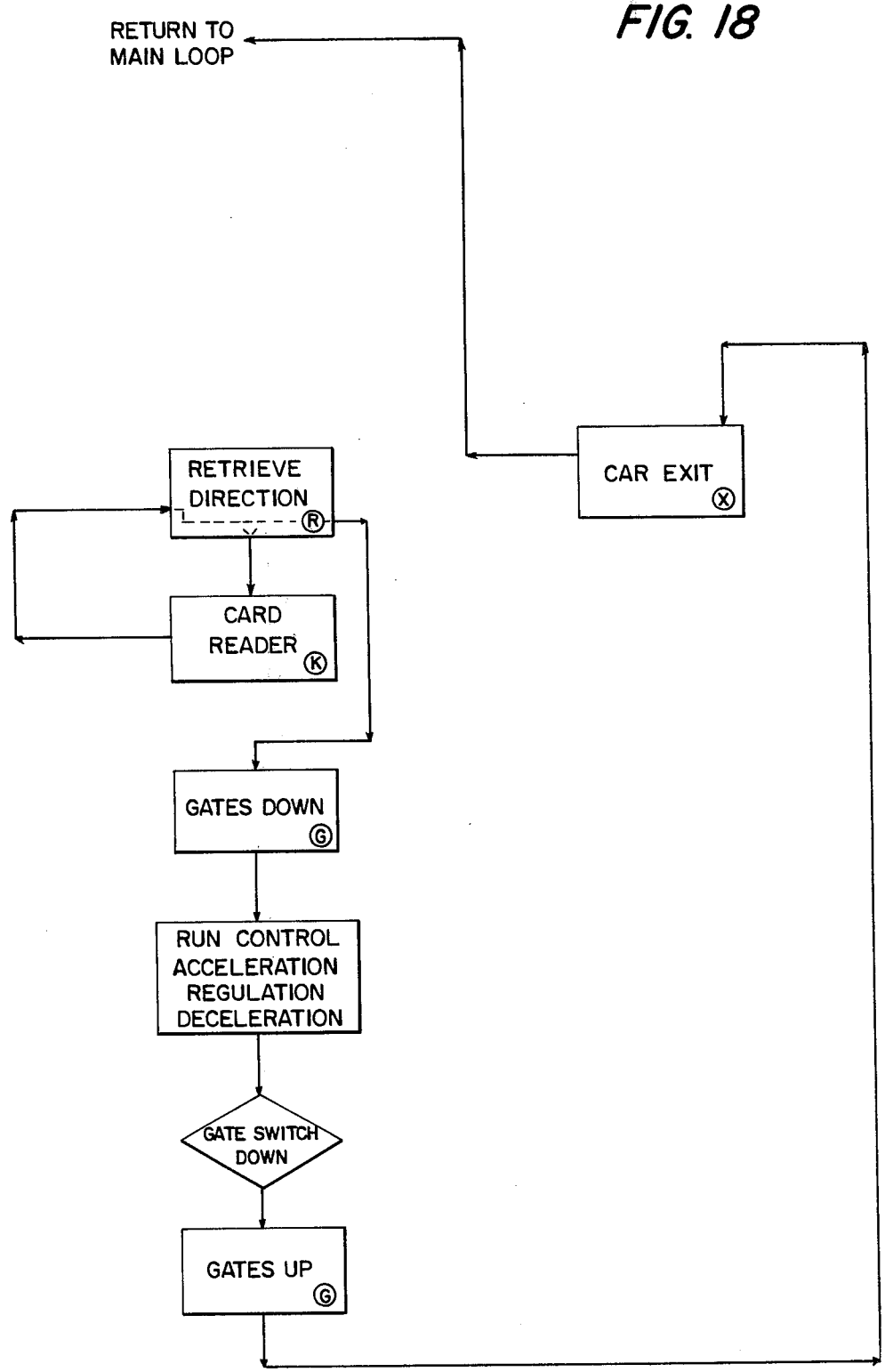
FIG. 18 is a generalized flow diagram depicting only those subroutines of FIG. 8 which are used in the normal retrieve sequence.
Figure 21:
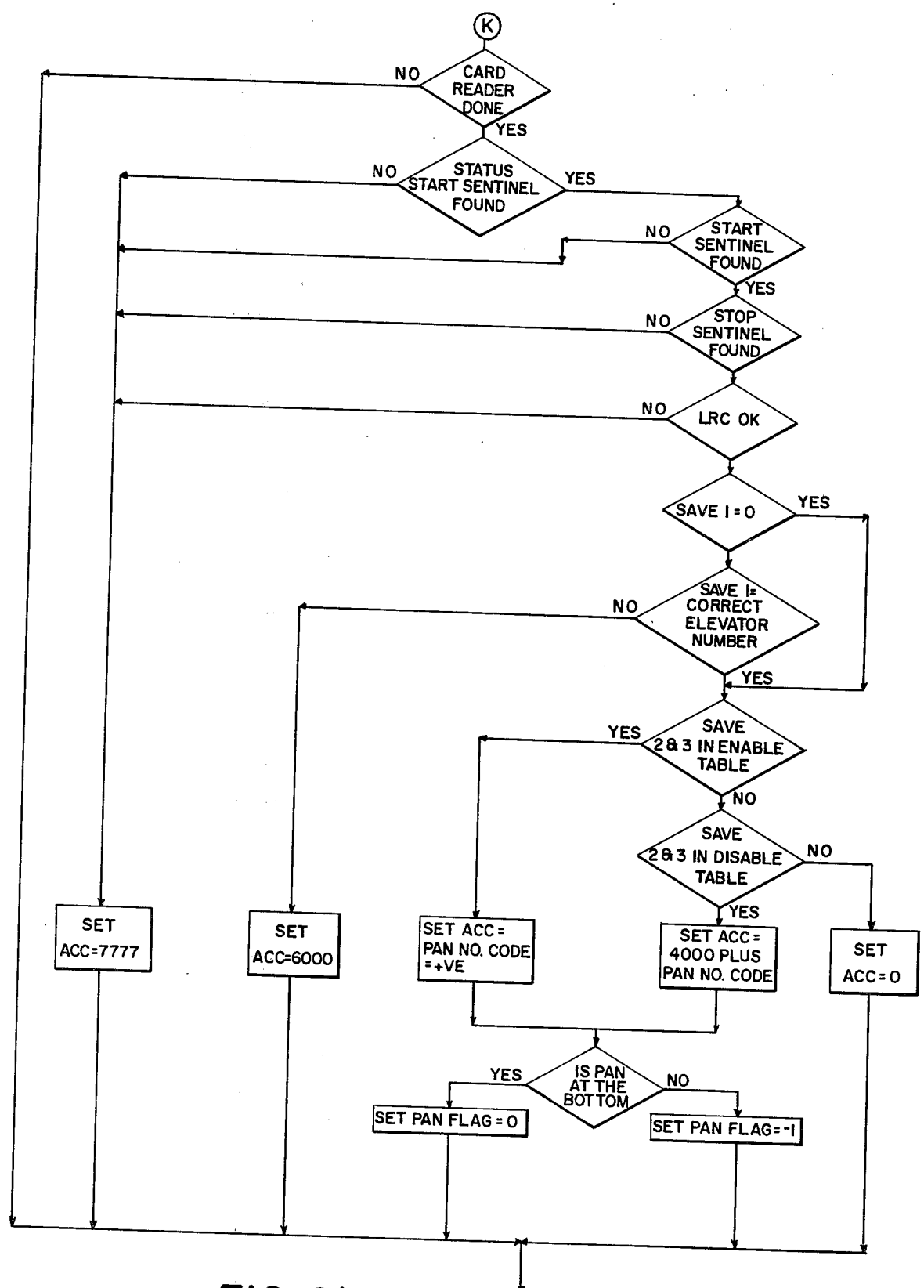
FIG. 21 is a detailed flow diagram of the card reader subroutine.

From the retrieve direction subroutine 400, the main loop continues to the card reader subroutine 500 (see FIG. 21). The purpose for entering the card reader subroutine at this time is to test for a card having been read by card reader 186. This is done by testing whether a particular bit of an input port has been set by the hardware associated with card reader 186. If a card has in fact been read, the normal retrieve sequence is commenced (see FIG. 18).

Figure 17:
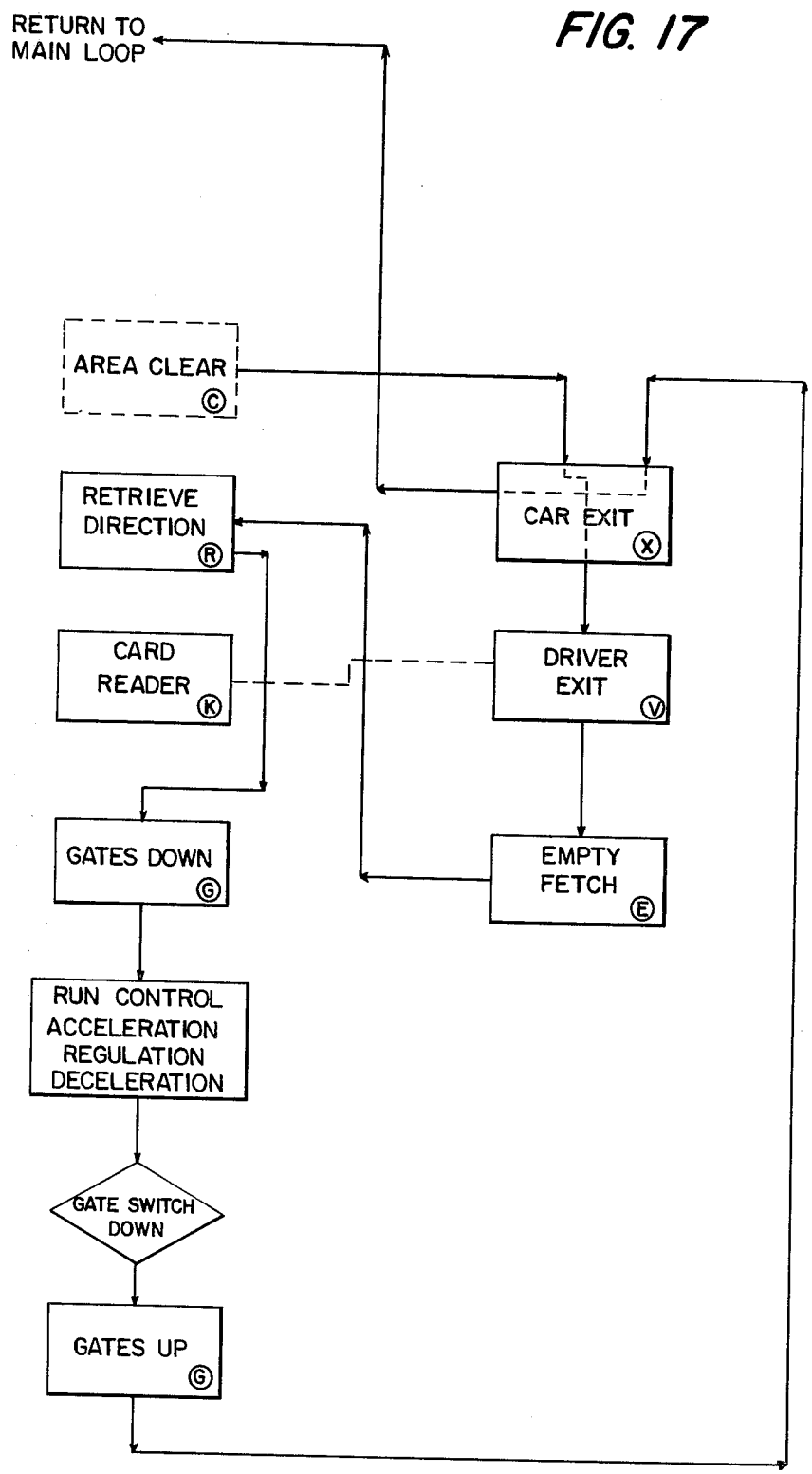
FIG. 17 is a generalized flow diagram that includes only those subroutines depicted in FIG. 8 which are used during the normal park sequence.

The card reader subroutine 500 is also called by the driver exit subroutine during the normal park sequence (see FIG. 17).

Each magnetic card in a presently preferred embodiment has nine digits recorded thereon. Each digit is transmitted in a 4-bit binary coded decimal format together with one parity bit and is stored in a buffer register (not shown) with the least significant bit first and the parity bit last until it is needed by the computer program. Also, a start sentinel, a stop sentinel, and a longitudinal redundancy check (LRC) or parity check are used. The first three digit word of the three words, (save one) represents the particular elevator 10 and is checked first in card reader subroutine 500 to ensure that the card is proper for the particular elevator 10 on which it has been used. The second and third words (save two), and (save three) represent the particular card and correspond to the vehicle being parked. (Save two) and (save three) are stored in the pan code table at the address that represents the particular pan that was at the bottom of car elevator 10 when the card was read. Thus, when a vehicle is being retrieved, the proper pan is identified by merely checking the number read on that card with all of the numbers stored in the pan code table.

The purpose of card reader subroutine 500 is the same for both of the above-mentioned entry cases. The card reader subroutine 500 checks for a card having been read and if one has, causes one bit at a time to be entered from the card reader buffer register into the computer memory. After having read the card into memory, the card reader subroutine 500 checks the read number and sets the accumulator with one of five values based on the results of processing the read card number. If the code is a valid number, but was not found in the pan table, a zero is stored in the accumulator. If there was a bad read of the card, the number $7777_8$ is stored in the accumulator. If the number read from the card is found in the enable pan table, a plus number is stored in the accumulator. If the number read on the card is found in the disable pan table, the number $4xxx_8$ (the "x" represent any other digit) is stored in the accumulator. Finally, if the card is for the wrong elevator 10, the number $6xxx_8$ is stored in the accumulator. In addition, the card reader subroutine sets a pan flag which is tested later to either a plus or minus value if the pan for the code being read is not at the bottom of the elevator 10 and clears the flag (i.e., sets the pan flag equal to zero) if the pan corresponding to the code read by the card reader is located at the bottom or car elevator 10.

Card reader subroutine 500 further has provision for checking for "save two" and "save three" both being equal to $7777_8$. This is a special number used on a master card by the operator so that the operator can park any one or more vehicles on car elevator 10. In addition, provision is made for having a master card that is usable on any particular elevator 10. This is done by setting the "save one" word on the card equal to zero.

If card reader subroutine 500 was called by driver exit subroutine 800, the program returns thereto at this point. On the other hand, if card reader subroutine 500 was entered from retrieve direction subroutine 400, the accumulator is tested (not shown) for the value stored therein and the program branches according to the test. If the accumulator contains a positive value, the program branches to retrieve direction subroutine 400 to continue the normal retrieve sequence. For any other value in the accumulator, an appropriate legend is displayed on control panel 70 and the program returns to the main loop. If the accumulator contains either a zero or a $6000_8$ number, legend 98 is displayed. If the accumulator contains a $4xxx_8$ number, legend 80 is displayed. Finally, if the accumulator has $7777_8$, legends 100 and 86 are displayed. For all cases where the accumulator contains a number other than a plus number, after a predetermined time delay, all legends are extinguished for legend 100 and the computer program returns to the quiescent state operating in the main loop.

Figure 11:
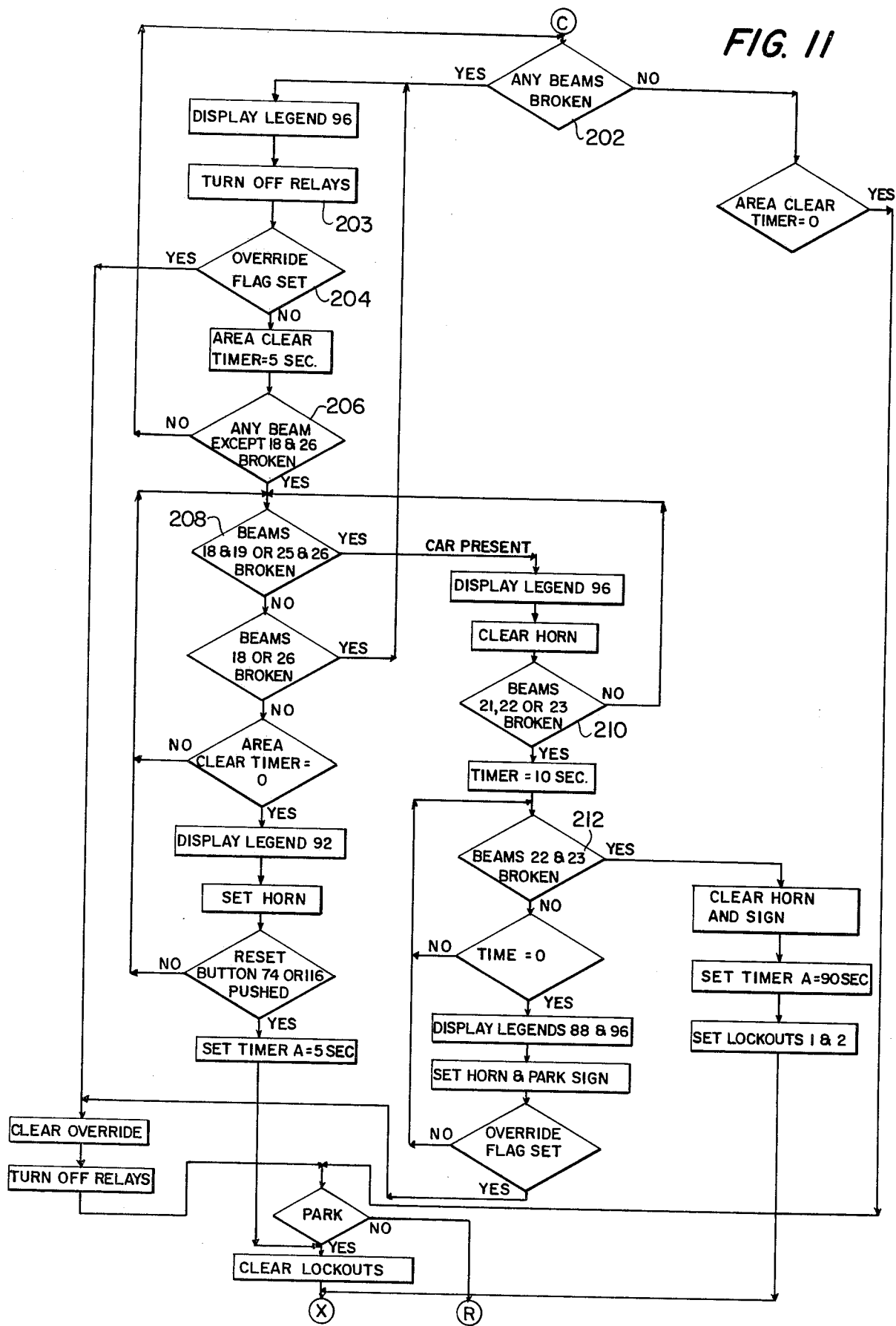
FIG. 11 is a detailed flow diagram of the area clear subroutine.

With reference now to FIG. 11, the determination of whether a car is present or whether a person is present within stall 10c will now be explained. Assuming that a car has entered stall 10c and has broken entrance beam 26 (see also FIG. 2), the "YES" exit from decision box 202 is taken and legend 96 is displayed asking any customer who desired to retrieve his or her car to wait. All relays are turned off by command box 203 so as to prevent the operation of elevator 10 so long as any one of the thirteen beams are broken. The program will then drop down through decision box 204 (since the override button 124 was not depressed the override flag would remain clear) through decision box 206 where the program will stay in a loop returning to the entrance of decision box 202 until a beam other than entrance beam 26 or exit beam 18 become broken. At that time, decision box 208 will determine whether both entrance beams 25 and 26 or both exit beams 18 and 19 are broken. If this is determined, the program assumes that a car is present and will remain in a loop between decision box 208 and a decision box 210 where pan 14 beams 21, 22, and 23 are checked until one of those beams is broken. As soon as a beam 21, 22 or 23 is broken, the timer is set for ten seconds and the driver has that period of time in which to break both beams 22 and 23 at the same time. If this does not occur, the horn is activated and legend 88 is displayed indicating that the vehicle is improperly parked. As soon as beams 22 and 23 are broken as determined in decision box 212, both lockouts are set and the program exits to car exit subroutine 300.

On the other hand, if decision box 208 has determined that the two entrance beams are not simultaneously broken, and neither entrance beam 26 nor exit beam 18 are broken, as decided in decision box 210, the program assumes that a person is inside stall 10c and the horn will be activated when area clear timer expires in five seconds.

If a car has been detected in area clear subroutine 200 as just described, the program branches to the car exit subroutine 300 (see FIG. 12), through the principal entrance (X). This entrance allows the timer and lockouts to be preset to any value depending upon the status of the beams. The two lockouts, lockouts 1 and 2, are used as a pair of flags to determine the direction of the last person or object which travelled through entrance beams 26 and 25. The balance of the subroutine develops the appropriate legend to be displayed at customer control panel 70. Program control stays within car exit subroutine 300 until stall 10c is clear of people and a vehicle or until stall 10c is clear of people and a car is parked properly on pan 14.

A second entrance into car exit subroutine 300 is entered from gates up/down subroutine 600 on the error condition in which the down limit switch of the gates are not reached. At this entrance, the lockouts are cleared and the timer is set to thirty seconds.

Car exit subroutine 300 is exited first in the case where stall 10c is clear and no beams are broken. Program control then passes back to the main loop. The second exit is taken if a car is properly parked and the driver has exited from stall 10c. The third exit is taken when the system is under manual control and decisions have been made based on control push-buttons being depressed.

Figure 12B:
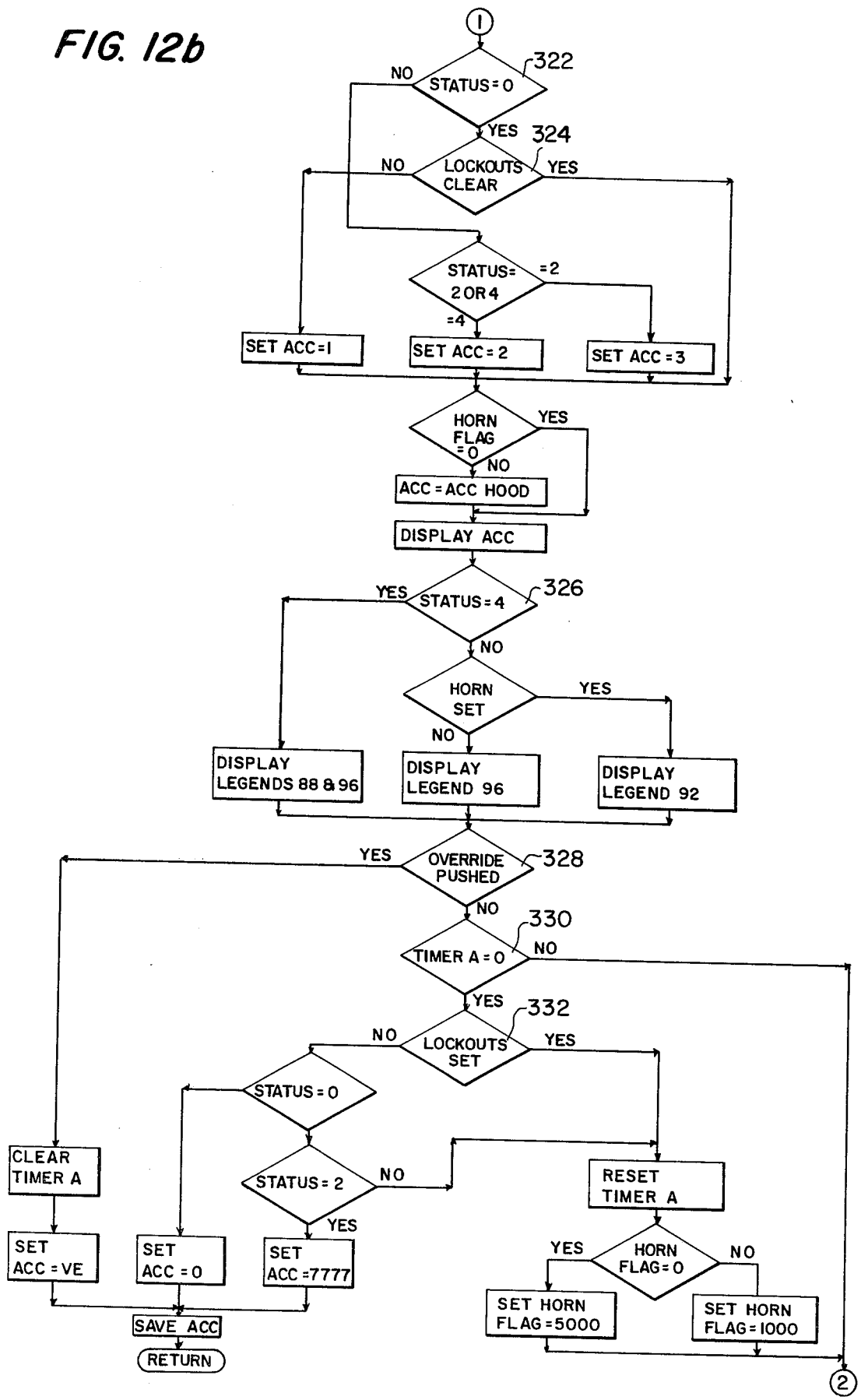

With particular reference to FIGS. 12a and 12b, lockout 1 is initially cleared if either entrance or exit beam 26 or 18, respectively, are broken. Timer A is set for five seconds so that the control stays in the subroutine for at least that period of time while it awaits the breaking of an interior beam. This can be seen as the program progresses from decision boxes 304, 306, 308, and 310 where all of the beams with the exception of the two outermost beams 18 and 26 are progressively examined. If none of these beams are broken, the status is set equal to zero in box 312 and the program proceeds through a decision box 314 that is used to intermittently activate horn relay 172 by checking the horn flag and horn state. The program proceeds through decision box 316 where the "YES" exit is taken since at this time the horn is not activated and the horn flag does equal zero. Because the status was set equal to zero, the "YES" exit is taken from decision box 322 (FIG. 12b). Because lockout 1 was cleared and if lockout 2 has not been set, the "YES" exit from decision box 324 is taken and the accumulator remains what it was when car exit subroutine 300 was entered. The program then proceeds on to decision box 326 where the "NO" exit is taken since the status has been set equal to zero. From there, the "NO" exit is taken from decision box 328 because the override button 124 has not been depressed. Finally, it can be seen in decision box 330 where timer A is tested equal to zero.

If timer A is not zero at this point, the program returns back to FIG. 12a at the top thereof.

If either beam 18 or 26 were inadvertently broken, the next time through the loop after timer A has expired, decision box 330 would take the "YES" exit to decision box 332 where the "NO" exit is taken since no lockouts were set and program control returns to the main program.

It can also be seen from FIG. 12a that lockout 1 will be set and lockout 2 cleared whenever the interior entrance and exit beams, beams 25 and 19 respectively, are broken and at that point, timer A is set for a much longer period of time of thirty seconds. Similarly, the breaking of any one of side beams 27 through 30 would take the exit from decision box 308 that set both lockouts and set even a longer time for timer A.

The logic from the testing of horn flag equals zero in decision box 334 entered from the "YES" exit of decision box 314 to where the program returns to enter decision box 316 merely sets the rate at which the horn will be intermittently activated. If horn flag equals 5000 (a negative number) the horn beeps at a rapid rate, and if horn flag equals 1000 (a positive number) the horn beeps at a slower rate.

A summary of the different statuses used in car exit subroutine 300 is as follows. Status 0 is used to indicate that nothing is in the unit. Status 1 is used to indicate that only lockout area 1 has been set. Status 2 indicates that both lockout areas 1 and 2 have been set. Status 3 is used to indicate that a vehicle is in stall area 10c and no person has exited therefrom. Status 4 is used to indicate that a car is present in stall 10c and at least one person has exited therefrom without any other persons remaining in stall 10c who are breaking any of the interior beams. Finally, status 5 is used to idicate that the elevator 10 is operating and pans 14 are revolving.

Figure 15:
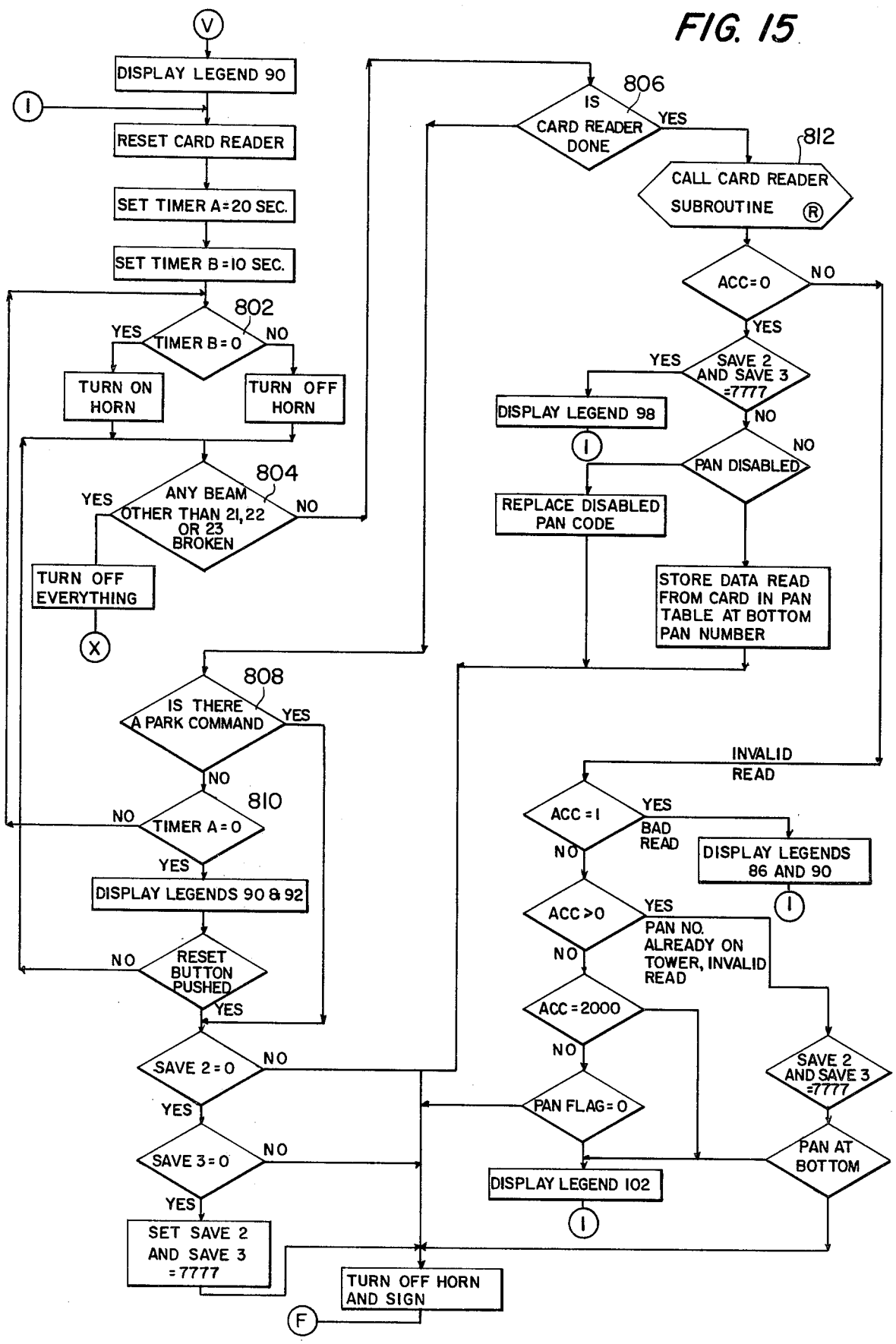
FIG. 15 is a detailed flow diagram of the driver exit subroutine.

Under the normal circumstances, with a car properly parked, control will exit car exit subroutine 300 with the accumulator having a negative number therein so that jumps made upon testing of the accumulator (not shown) will transfer the program to driver exit subroutine 800, depicted in FIG. 15. The function of driver exit subroutine 800 is to scan the surveillance beams and the card reader for activity. Should a person be detected either entering stall 10c or in stall 10c, control passes back out of driver exit subroutine 800 to car exit subroutine 300.

If a card has been read by the card reader, the card reader subroutine 500, as mentioned above, is called to transfer the information read from the card to computer memory and to search the pan code table for the card code. If the card has already been used, the card code is stored and control passes out of driver exit subroutine 800 to empty fetch subroutine 900 where the next empty pan 14 to be transferred to the bottom of elevator 10 is determined.

As soon as driver exit subroutine 800 is entered (FIG. 15), legend 90 is displayed to inform the driver that the card must be slid through reader 76 to complete parking. Timer A is set at twenty seconds and timer B is set at ten seconds, timer B expiring first and turning on the horn should the driver not exit within that period of time. This can be seen as decision box 802 turns on the horn when timer B equals zero. As determined in decision box 804, should any beam be broken other than the beams monitoring car pan 14, the program turns off all relays to prevent operation of elevator 10 and exits back to car exit subroutine 300, as discussed above. Until the driver has slid the card through the card reader, decision box 806 keeps program control in a loop which also includes decision box 808 (for monitoring whether there is a manual park command) and decision 810, which checks whether timer A has expired. The call box 812 calls card reader subroutine 500 as soon as the card reader is done. The logic below call box 812 simply tests the accumulator upon exiting card reader subroutine 500 to display appropriate legends as discussed hereinabove.

Timer A, tested for expiring in decision box 810, has the purpose of ensuring that the driver has not walked off and left the vehicle on pan 14 without inserting the card to park the vehicle.

Figure 16:
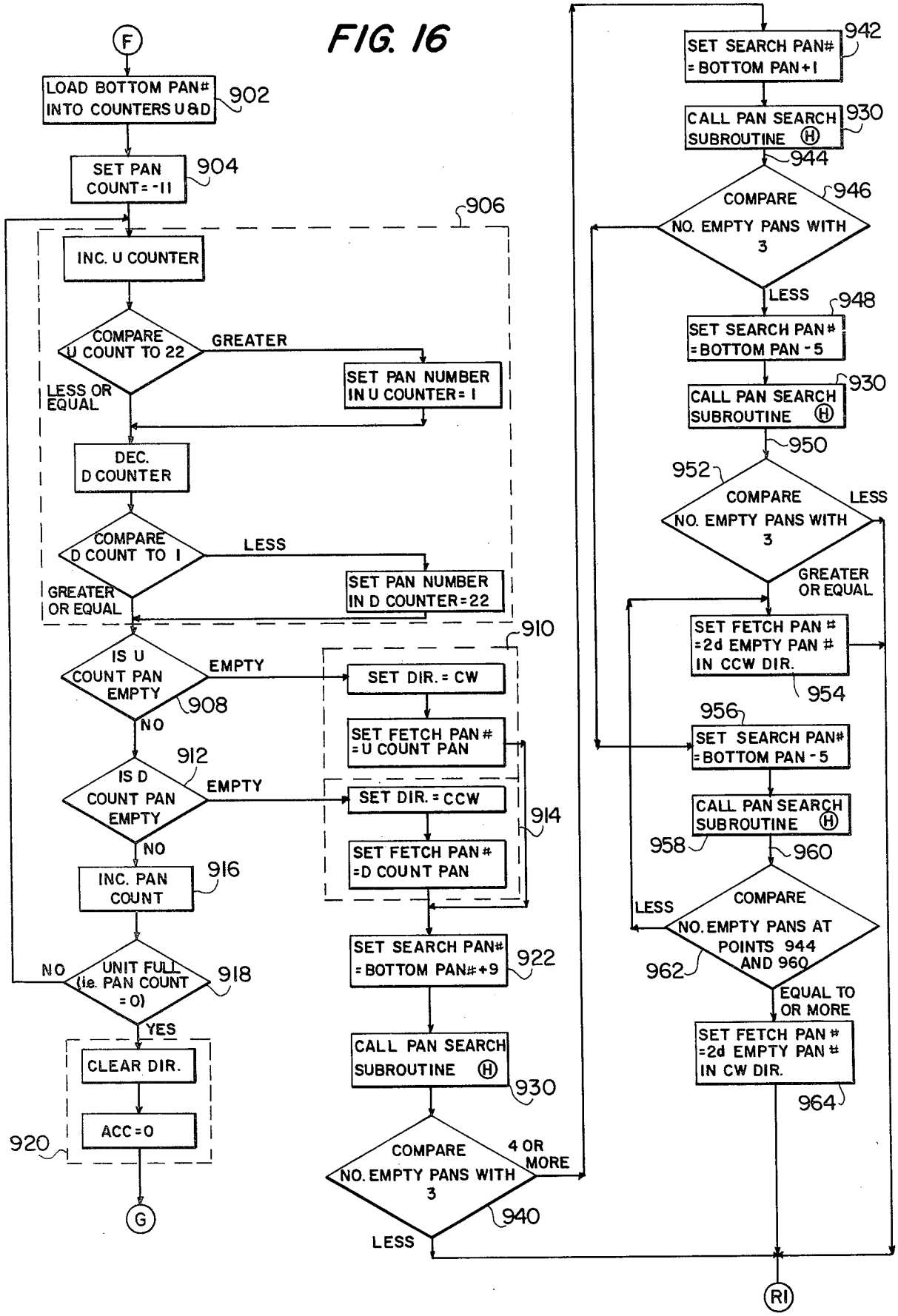
FIG. 16 is a detailed flow diagram of the empty fetch subroutine.

The empty fetch subroutine 900 is depicted in FIG. 16. This subroutine is entered just before elevator 10 is operated in a normal park sequence. The function of empty fetch subroutine 900 is to determine whether elevator 10 is full and if not which empty pan 14 should be brought down next. Two somwhat contradictory considerations are evaluated by the subroutine, balancing the loading of elevator 10 (i.e. trying to have an equal number of vehicles stored on each side thereof irrespective of the position of the pans) and keeping the rotation of elevator 10 to a minimum. If elevator 10 is empty, the logic in empty fetch subroutine 900 results in parking a vehicle on every other pan for the first six vehicles parked, and then parking a vehicle on every pan until the first loaded pan is reached. Thereafter, the alternate pans skipped are filled up.

The only entrance to empty fetch subroutine 900 is from driver exit subroutine 800. However, there are two exits from the subroutine. One exit is for the case where an empty pan was located and the controls proceed to run elevator 10 to bring the empty pan to the bottom. The second exit is used when elevator 10 is determined to be full whereupon control proceeds to enter the gate up/down subroutine to lower the gates. The main loop is then re-entered with the full flag set so that area clear subroutine 200 is skipped.

With particular reference to FIG. 16, the logic in empty fetch subroutine 900 is shown. The first thing upon entering empty fetch subroutine 900 is that the bottom pan number is loaded into an up counter and a down counter, as shown in box 902. The subsequent flow path then results in incrementing the up counter and decrementing the down counter one at a time and searching the pan code table to ascertain the closest location to the present pan on the bottom which is empty. Because elevator 10 is an endless conveyor, and because there are twenty two pans in a preferred embodiment, tests are also made as shown in 906 to reset the up counter and down counter should they respectively pass pan numbers 22 or 1. Depending upon which counter first locates an empty pan (which is signified by the memory location corresponding to that pan having a zero number stored therein), the clockwise or counterclockwise flag will be set. By definition in a preferred embodiment, the clockwise direction is the direction of rotation necessary to lower a pan on the right side of elevator 10 when looking at the entrance 10a thereof to the bottom most position. The pan numbers increase in the clockwise direction. The fetch pan variable is set equal to the first pan number found to be empty, with the system defaulting to an up count pan number. Then, in box 922, the search pan number variable is set equal to the bottom pan number plus nine pans so that the top pan 14 in elevator 10 together with two pans on either side thereof, can also be checked for the number of empty pans therein.

The pan search subroutine (not shown) which is called at various points in empty fetch subroutine 900 is a relatively simple subroutine whose purpose is to determine the number of empty pans out of five pans in the clockwise direction from the pan 14 under consideration when the pan search subroutine is entered. The variable labelled "empty pan count" equals the number of empty pans which were found.

When empty fetch subroutine 900 is re-entered from the pan search subroutine, empty pan count is compared with the number 3. Thus, in decision box 940, if it is determined that there are three or less empty pans at the top of elevator 10, then the pan which will be fetched is the first empty pan located. However, if there are four or five empty pans out of the five searched, the subroutine branches to box 942 where the search pan is set equal to the next pan in the clockwise direction from the bottom pan which was just filled with a vehicle. The pan search subroutine is then called to determine the number of empty pans out of five additional pans in the clockwise direction. If there are three or more empty pans, as determined in decision box 946, the number of empty pans of the five pans in the counterclockwise direction from the bottom most pan are determined and the second empty pan in the clockwise direction is selected as the pan to be fetched if the number of empty pans found in the counterclockwise direction is equal to or greater than the number of empty pans found among the five pans in the clockwise direction from the bottom most pan. This decision is made in decision box 952. If, however, decision box 946 determines that the number of empty pans of the five empty pans in the clockwise direction from the bottom most pan plus one is less than three, then the number of empty pans of the five pans in the counterclockwise direction from the bottom most pan is compared with the number 3 in decision box 952. If this number is equal to or greater than 3, then the pan to be fetched is set equal to the second empty pan from the bottom most pan in the counterclockwise direction. Otherwise, the pan which will be fetched is the closest pan to the bottom most present pan.

As mentioned above, if empty fetch subroutine 900 determines that the unit is full in decision box 918, then the subroutine is exited and the gates up/down subroutine 600 is entered to lower the gates.

Figure 13:
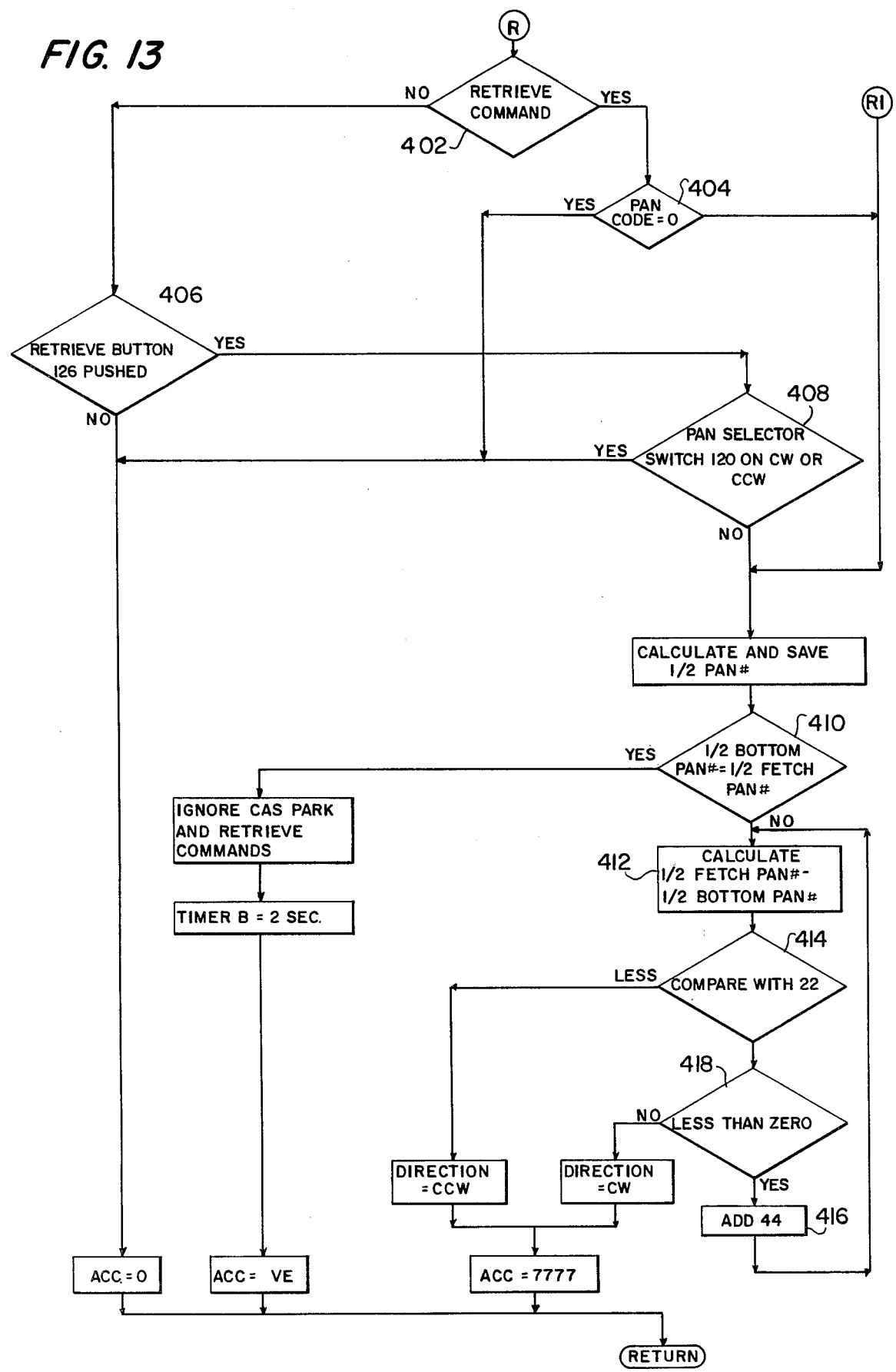
FIG. 13 is a detailed flow diagram of the retrieve direction subroutine.

Control leaves empty fetch subroutine 900 when elevator 10 is not full with the number of the pan to be fetched and enters retrieve direction subroutine at entrance R1 in order to determine which direction elevator 10 must be rotated (see FIG. 13).

FIG. 13 is fairly straightforward and the only thing that need be mentioned about the subroutine is that the computer program keeps track of the half pan count number. Since the particular embodiment of elevator 10 has twenty two pans, there are forty four half pan numbers. Thus, it can be seen why in box 412, the half fetch pan number minus the half bottom pan number is calculated and compared in decision box 414 with the number 22. It should also be obvious why the number 44 is added in box 416 should the half pan number calculated in box 41, made in decision box 418, be less than zero. Upon exiting retrieve direction subroutine 400, the accumulator is loaded with the negative number $7777_8$. Immediately upon exiting retrieve direction subroutine 400, the accumulator is tested and since it is negative, control of the program is directed to gates up/down subroutine 600 to lower the gates and turn on the main hydraulic motor, as shown in boxes 608 and 610 in FIG. 14b.

In addition to being entered from retrieve direction subroutine 400, gates up/down subroutine 600 is entered from empty fetch subroutine 900 as discussed above when the unit is full and from the run control subroutines 700 to raise the gates after the desired pan 14 has been fetched and rotated to the bottom position.

Gates up/down subroutine 600 is only entered from one point and immediately the error codes are cleared in decision box 602. Then the accumulator is tested in decision box 604 for either a zero or a non zero number to determine whether the gates are to be lowered or raised, respectively. The subroutine also handles the possibilities of mechanical failures of the gates being raised and lowered, of people or objects obstructing the gates, or blocking an optical beam. As soon as any of the foregoing conditions are detected, the relays are immediately turned off so that elevator 10 cannot be operated and in most cases control stays in a tight loop waiting for an operator to be called and to press override button 124. Legend 80 is displayed at these times so that the customer will know to call the attendant.

Figure 14A:
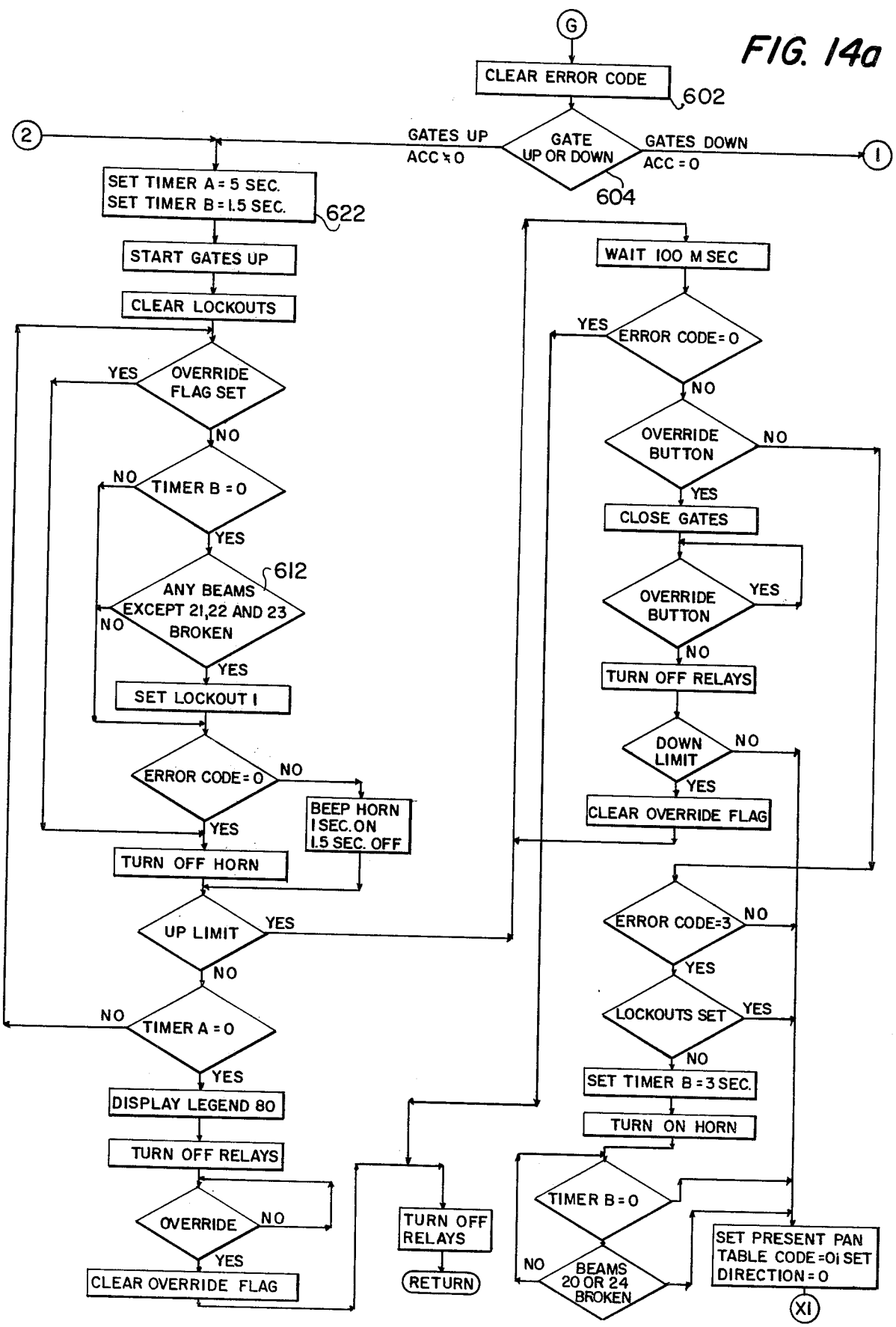

In the gates down portion of the subroutine, as shown in FIG. 14b, timer A is initially set at a half a second to permit the gate mechanism to settle down before the actual lowering of the gate is monitored. However, it should be noted that all beams with the exception of beams 20-24 which monitor the pan and the gate edge, are still investigated so that the gates can be immediately raised should either of these conditions be violated.

There are three types of exits from gates up/down subroutine 600. The first exit is the normal exit upon completion of the function for which the subroutine was entered. The second exit is for the occasion when the gates/down function precedes an operation of elevator 10, which in this case is the starting of the main motor as the gates go down in order to allow the hydraulic pressure to build up while the gate is being lowered. The third type of exit is for occasions where there was some type of failure which did not permit the gates to operate properly. These failures may be detected, for example, by a slackness in the gate cable used to raise the gate, in excessive time to raise or lower the gate, and in something obstructing the gate as detected by the gate edge sensor (which can simply be a tripper wire). In addition, the third type of exit is taken if any of the beams, other than the beams monitoring pan 14, are blocked.

Most of the flow chart in FIG. 14 is self-explanatory. However, it is noted that in the gates down part of the subroutine the entrance and exit beams, beams 25 and 26 and beams 18 and 19, are only checked for the first 1.8 seconds (0.5 seconds in box 616 and 1.3 seconds for timer C in box 618) because the gates will obstruct these beams when it is in the down position. Hence, only the side beams are monitored, in decision box 620 after timer C runs out. Similarly, the entrance and exit beams are not checked for the first 1.5 seconds in the gates up subroutine (timer B set for 1.5 seconds in box 622).

As mentioned above, the present computer program is designed under the interrupt principle. A main interrupt subroutine (not shown in detail) is entered every 2.5 milliseconds when a clock pulse is sent to the interrupt line of the 6100 microprocessor in microcomputer 154. The interrupt subroutine is designed to be transparent to the program that is operating at that time.

The function of the interrupt subroutine includes controlling the scanning of the detection means on a rotating basis and updating the optical beam status word appropriately, as described herein above. The interrupt subroutine also increments the timers, updates the pan position location information, and develops the speed information for the run control program. Also, should pan 14 not be properly positioned at the bottom when elevator 10 stops, provision is made for exiting the interrupt subroutine to the emergency stop subroutine.

Also accomplished during the interrupt subroutine is to update the tower safety inputs, to sense changes in the operation mode as set by key switch 110 and to check that the break switch is released if pans 14 are rotating. This last function is accomplished by keeping the value of the direction word at zero if the unit is stationary, setting it at plus one for a clockwise rotation, and setting it at a minus one for a counterclockwise rotation. Finally, the CAS subroutine 1000 is called in the interrupt subroutine to receive any commands from the central computer 150 and to provide any status words requested thereby.

Figure 20:
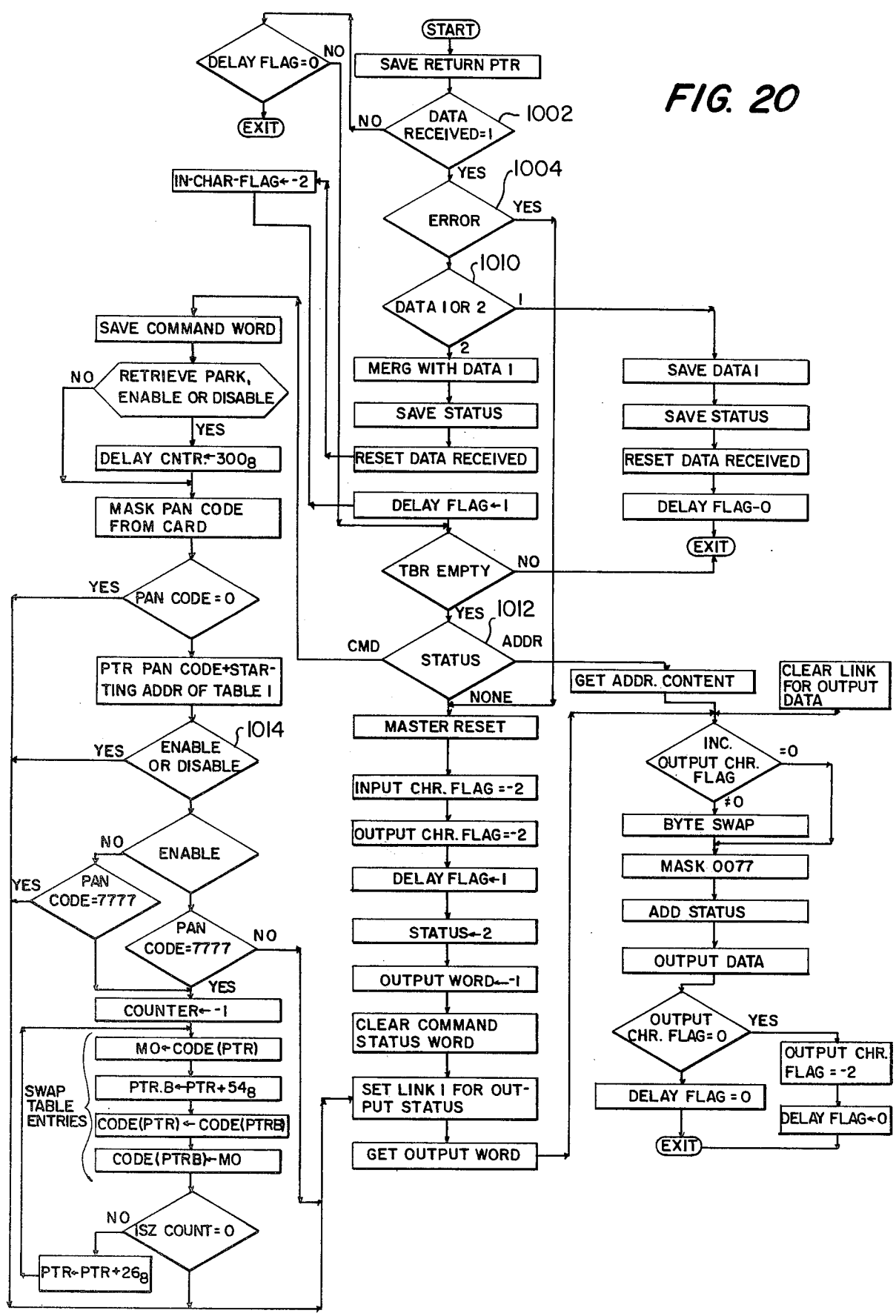
FIG. 20 is a detailed flow diagram of the central accounting system subroutine used by a peripheral computer to acknowledge receipt of instructions and send information to a central computer.

Central accounting subroutine 1000 is depicted in FIG. 20. This subroutine handles all input and output from CAS computer 150 in a plurality of cycles. This is necessary because the data is transmitted from CAS computer 150 to microcomputer 154 (see FIG. 19) in a serial manner, and the conventional UART can only handle 8-bit words (six data bits, a parity bit added by the UART and a status bit). The status bit is to determine whether the word being sent from CAS computer 140 is a command word or a status word requesting the data be sent back to it from the address identified by the status word.

The first function performed upon entry of CAS subroutine 1000 is to ascertain in decision box 1002 whether any data has been received from CAS computer 140. This check is simply done by ascertaining the status of a flag that is set by hardward interface circuitry. If no data has been received and the delay flag is not equal to zero, the subroutine is promptly exited and control returns back to the interrupt subroutine. The delay flag is not equal to zero whenever only half of the word sent by CAS computer 140 has been received. The error checked in decision box 1004 refers to an error flag set by the appropriate UART whenever an overrun condition, a framing condition, or a parity error is detected by the UART. As can be seen from decision box 1010, data word 2 is interrogated first and a delay flag of 1 is set at the end thereof, whereas a delay of 0 is set after the data word 1 has been interrogated.

Decision box 1012 determines whether the word sent from the CAS computer 140 is a command word or an address word by interrogating the status of the most significant bit. By using decision box 1014, CAS computer 104 can determine whether the card code read from a card is to be stored in the enable pan code table or the disable pan code table. This feature clearly has the advantage of permitting a central accounting being done by CAS computer 140. A card code can be stored in the disabled table, for example, until the fee has been paid. Other features available from the CAS subroutine will be apparent from a study of FIG. 20.

When the interrupt subroutine is re-entered from CAS subroutine 1000, all registers are restored and program control continues at the occasion where the interrupt was generated.

Whenever pans 14 are to be rotated in elevator 10, the run control subroutines 700 are entered. The subroutines making up run control subroutine 700 include an acceleration subroutine, a pan check subroutine, and a deceleration subroutine.

Acceleration subroutine is first called upon the exiting from gates up/down subroutine 600 after the gates have been lowered, none of the safeties have been tripped, and none of the surveillance beams have been broken. Hydraulic pressure is monitored by the subroutine so that should a high pressure condition be discovered, the speed range of elevator operation can be decreased. This subroutine also releases the brake and monitors the speed of rotation of pans 14 during the acceleration thereof in accordance with an experimentally obtained, predetermined rate. The acceleration and direction of rotation of the pans in elevator 10 are determined by the rate with which the hydraulic pump swash plate is tilted and the direction in which it is tilted by stepper motor 162 (see FIG. 19). The speed of stepper motor 162 is determined by the frequency of the pulses sent to it. For simplicity of control, the speed with which pulses are sent to stepper motor 162 is constant and the frequency has been experimentally determined so as to maintain the acceleration within accepted guidelines. With a constant frequency, the ultimate speed with which elevator 10 is operated is simply determined by the amount of time the pulses are transmitted by microcomputer 154 to stepper motor 162. A presently preferred method is simply to control the application of conventional 60 Hz. alternating current to stepper motor 162. Thus, stepper motor 162 is stepped sixty times per second. Obviously, the longer the alternating current is applied to stepper motor 162, the higher the final speed of rotation of pans 14 in elevator 10. When the timer has expired, the acceleration subroutine is exited and the pan check subroutine is entered so that the location of the pan being fetched can be ascertained. The pan check subroutine is exited and the speed regulation subroutine is entered if the desired pan is not within a one half pan distance from the bottom of elevator 10. Control is then repeatedly returned to pan check subroutine from speed regulation subroutine until the desired pan is the desired one half pan length distance from the bottom.

The speed regulation subroutine obtains the maximum speed for the selected range of operation and sends signals to stepper motor 162 for a predetermined period of time to incrementally change (parity raise or lower) the speed of operation of elevator 10. Should the speed not be controllable within predetermined set points, the speed regulation subroutine is exited and the emergency stop subroutine is entered to stop the operation of elevator 10.

When the pan check subroutine determines that the desired pan is a one half pan length distance from the bottom, the deceleration subroutine is entered. The deceleration subroutine constantly monitors the position of the pan and the speed of rotation of elevator 10 so as to decrease the speed of revolution to zero when the desired pan is at the bottom. Should predetermined velocity limits (either high or low) be exceeded, the deceleration subroutine is exited and the emergency stop subroutine is entered so that operation of elevator 10 can be terminated. As in the acceleration subroutine, the speed of operation of elevator 10 and its speed of operation per unit of time (i.e. the deceleration thereof) is controlled by controlling stepping signals to stepper motor 162 in the appropriate direction. When the desired pan is at the bottom position, the deceleration subroutine also applies the main system brakes and turns off the main motor. The control is then sent to the gates up/down subroutine to raise the gates and continue in the normal park sequence or retrieve sequence.

Figure 9:
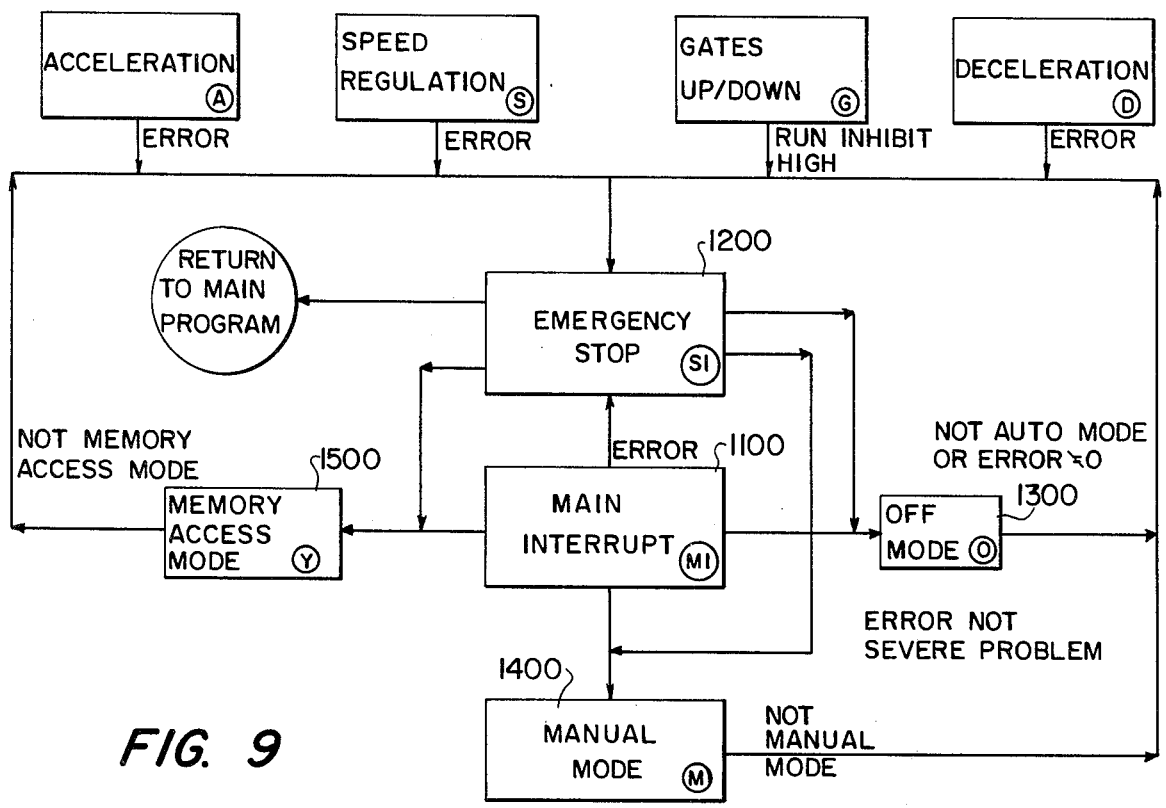
FIG. 9 is a generalized flow diagram showing the flow between some of the same sub-routines depicted in FIG. 8 during abnormal operations such as when an error is detected.
Figure 22A:
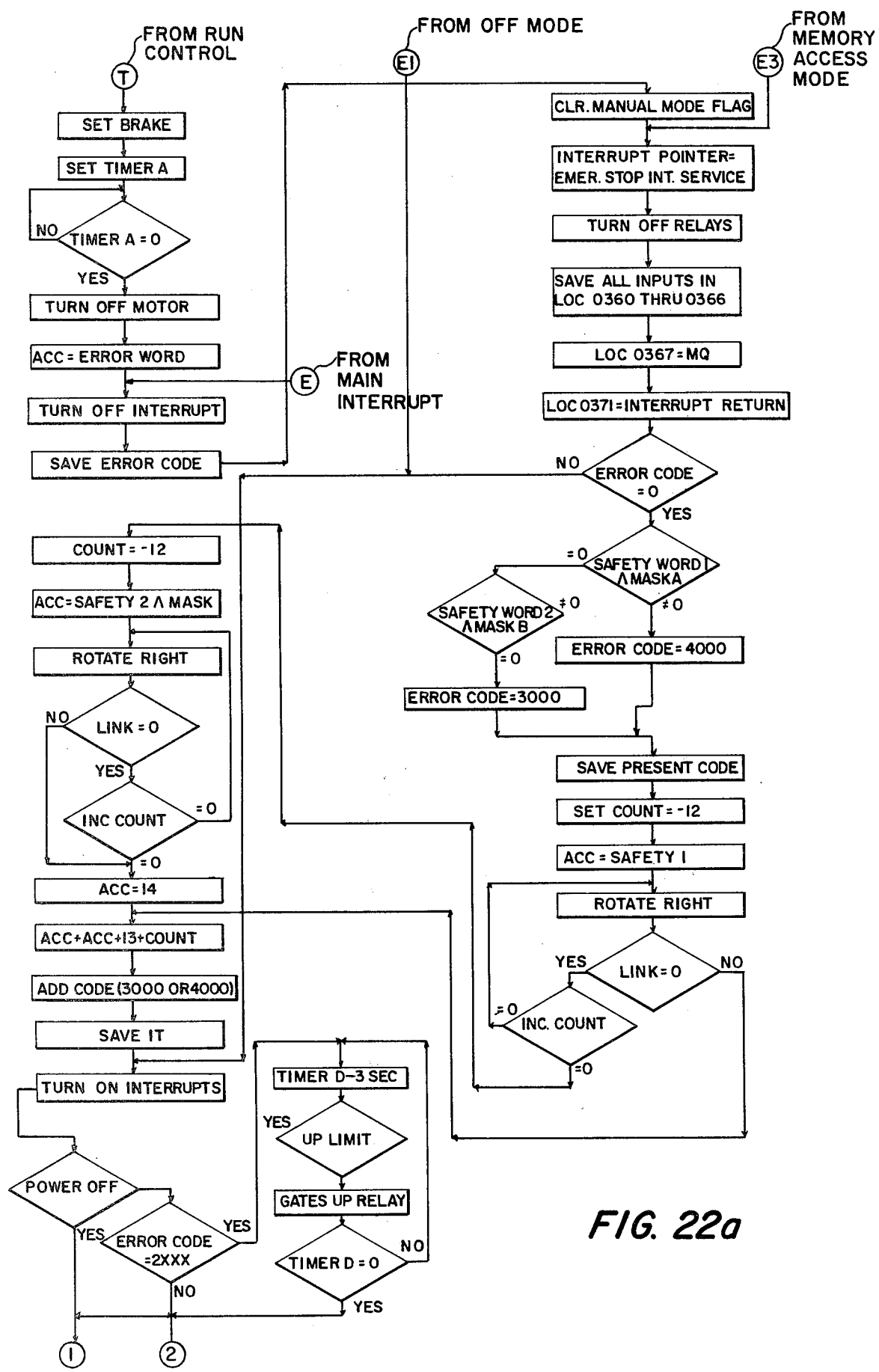
FIGS. 22a and 22b are detailed flow diagrams of the emergency stop subroutine.
Figure 22B:
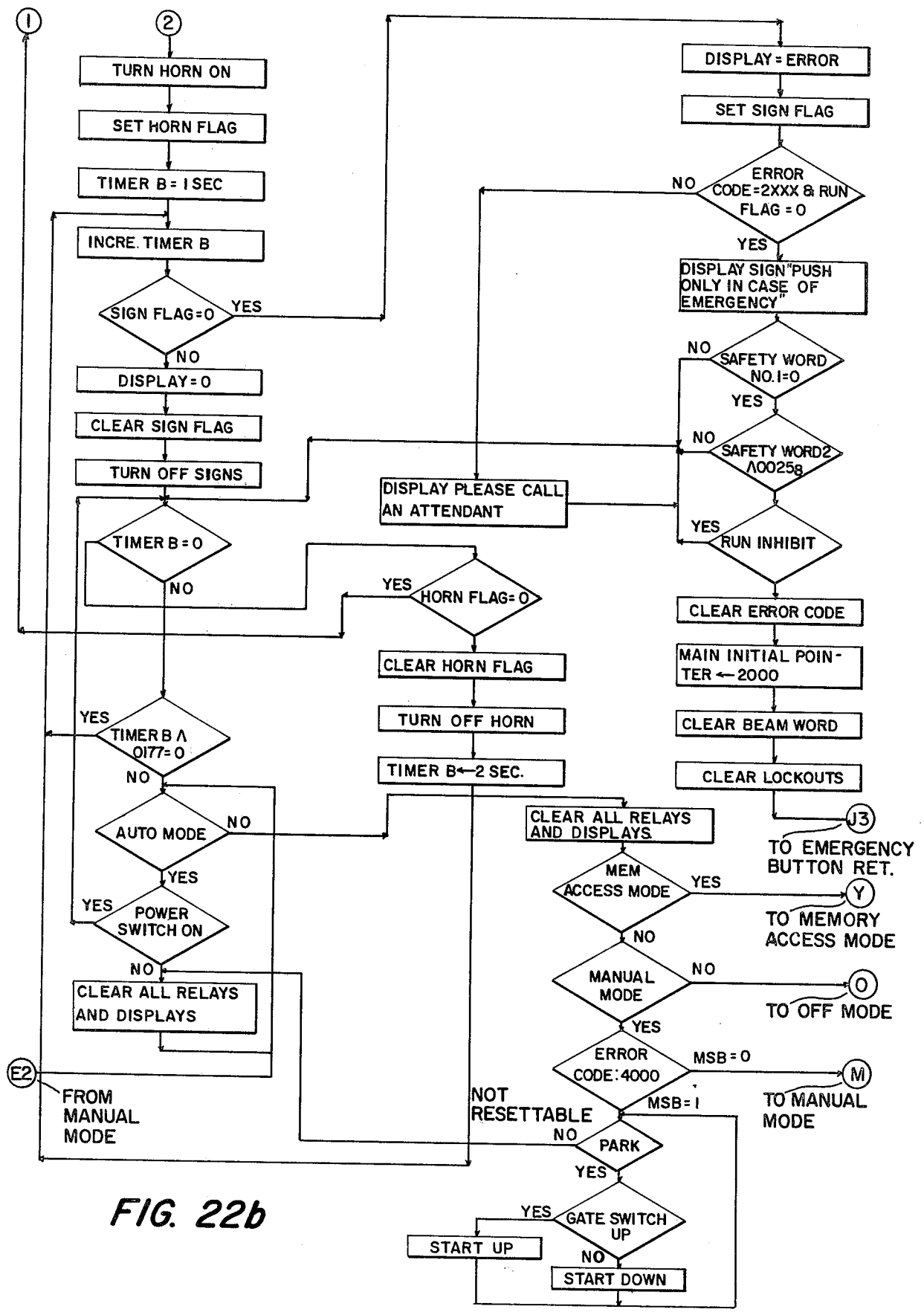

Whenever a serious error condition is detected in the acceleration, speed regulation, gates up/down, and deceleration subroutines, control is sent immediately to the emergency stop subroutine (shown in detail in FIG. 22). The general flow between the emergency stop subroutine 1200 and the other subroutines is diagrammatically shown in FIG. 9. The emergency stop subroutine 1200 is entered on any of the following occasions: the emergency stop button 72 or 118 is depressed; any safety sensor circuit is activated; or on any unrecoverable error in the run control sequence as described hereinabove.

The function of emergency stop subroutine 1200 is to turn off all power outputs, save the registers and input signals at the time of the error, and determine which one of three levels the error is. The errors are divided into the three levels so that less drastic action can be taken for less drastic errors.

The error codes are divided into the thousand series for minor difficulties resulting from personnel using elevator 10 taking too much time, the three thousand series codes which indicate a mechanical malfunction of a serious enough nature as to require the attention of an operator, but which can be easily corrected, and the four thousand series which are severe problems and which require inspection by qualified maintenance personnel.

The one thousand series of errors result if people have entered the stall area without a car being present and are staying too long or if a car is improperly parked on pan 14. A third type of error involves a car having been parked properly on pan 14, but the driver has not exited within a predetermined amount of time. These errors are easily cleared as soon as the required action is taken and reset button 74 is depressed by the customer or reset button 116 is depressed by the operator.

The three thousand series of error codes are sufficiently serious enough that once the error has been determined, key switch 110 must be operated to switch to the manual mode. While in the manual mode, as explained hereinabove, the memory location associated with the particular display code will be zeroed whenever the mechanical malfunction causing the error has been corrected. Examples of errors of the three thousand series include hydraulic oil reservoir high temperature, main motor high temperature, tower brake has failed to release, the upper or lower gate position switches indicate that the gates have not travelled their full distance, or a deceleration problem. After the tripped safety has been corrected and a pan is centered at the bottom in the manual mode, key switch 110 can be returned to the automatic mode position.

Whenever a four thousand series error has been indicated, key switch 110 must be turned to the off mode, the problem corrected, the power turned on, and the manual mode used to center a pan at the bottom. Exemplary errors of the four thousand series include activation of an emergency over speed brake, over current in the main electric motor, or a tower structural safety, such as the activation of a top strut safety by an open vehicle door. Other four thousand series errors include an improper tower sync signal or a disagreement between the drive tooth count (indicating pan position and used to determine tower revolutional speed) and the sync signal.

With reference again to FIG. 9, signal flow between an off mode subroutine 1300, a manual mode subroutine 1400, and a manual access mode subroutine 1500 shown with respect to the main interrupt subroutine 1100 and emergency stop interrupt 1200.

Off mode subroutine 1300 is entered from main interrupt subroutine 1100 upon the detection of the latter of placement of key switch 110 in the "OFF" position. Once entered, the subroutine turns off all interrupts, which results in redundant processor 138 activating master relay 174 which in turn deactivates all relays to shut down tower 10, clears the beam select word, clears all outputs, and clears the command and status word from CAS computer 150.

The manual mode subroutine 1400 and the memory access mode subroutine 1500 have been discussed hereinabove.

The foregoing invention has been discussed with respect to a particularly preferred embodiment thereof, however, as will be obvious to one of ordinary skill in the art, modifications and variations of the specific embodiments discussed hereinabove may be effected.

I claim:

1. A control system for controlling and monitoring the operations of a storage conveyor that includes an enclosed loading area with an entrance into which persons can take large objects to be stored on the conveyor or can enter to retrieve objects from the conveyor, a plurality of storage locations on the conveyor, and means for selectively moving the storage locations to the loading area, said control system comprising:

detection means for detecting the entrance, the presence and the departure of large movable objects such as vehicles and small movable objects such as people and for distinguishing between such large objects and such small objects, said detection means providing signals in response to said detection and distinction and comprising; a first means for producing and detecting a first beam, said first beam means being located so as to direct said first beam across the loading area entrance such that a large object or small object entering said loading area through said entrance must break said first beam, and comprising a second means for producing and detecting a second beam, said second beam means being located spaced from said first beam means in the direction of the interior of the enclosed loading area such that a large object or small object moving through the entrance toward the conveyor from outside the enclosed loading area must first break said first beam and then break said second beam;

and means receiving said signals for analyzing said signals to determine the presence of a large object or a small object inside said loading area, to prevent operations of the storage conveyor when a small object is detected therein, and to prevent operations of the storage conveyor when a large object is detected as being brought into the loading area until a small object is detected leaving the loading area.

2. A control system as claimed in claim 1 wherein said detection means further comprises a third means for producing and detecting a third beam, said third beam means being located so as to direct said third beam at the conveyor such that an object stored in a conveyor storage location positioned at the loading area can be detected.

3. A control system as claimed in claim 1 and further including means for detecting the proper positioning of the object in the conveyor storage location; and wherein said analyzing means is also for preventing the operation of the storage conveyor until an object detected in the conveyor storage location is also detected as being properly positioned.

4. A control system as claimed in claim 2 wherein said analyzing means comprises a general purpose digital computer system having a memory, a processor, input ports, and output ports, and wherein said computer system comprises means for storing signals about each conveyor storage location, said signals representing information that includes whether a particular conveyor storage location has an object stored therein and the identity of that object.

5. A control system as claimed in claim 4 and further including a plurality of media each of which contains a unique code and which are individual to objects to be stored in a conveyor storage location; and a medium reader connected to one of said input ports for reading said medium and transmitting to said computer system the unique code, said computer system for storing said unique code in a location in said memory representative of the particular conveyor storage location then at the loading area.

6. A control system for monitoring an enclosed area having an entrance and for controlling the operation of machinery located in said enclosed area, said control systems comprising:
    a first detecting means located at the entrance for detecting the passage of both large objects such as vehicles having a minimum first length and small objects such as people having a maximum second length moving in either direction through the entrance past said first detecting means;
    a second detecting means located spaced from said first detecting means in the direction of the interior of the enclosed area a distance greater than said second length but less than said first length, said second detecting means for detecting the passage of large and small objects moving in either direction past said second detecting means; and
    analyzing means connected to said first and second detecting means for determining the presence of an object in the enclosed area, for classifying an object as a large object when both said first and second detecting means detect the object at any same, given time and classifying an object as a small object when first one of said first and second detecting means detects and then no longer detects the object before the other one of said first and second detecting means detects said object, for determining the direction of movement of the object through the entrance depending upon the order of the detection of the object by said first and second detecting means and for preventing the operation of the machinery when a large or small object is detected entering said enclosed area until said small object is detected leaving said enclosed area.

7. A control system as claimed in claim 6 wherein said first and second detecting means each comprise a means for producing a beam and a means spaced from said beam producing means for detecting the presence of said beam, said first and second detecting means detecting the presence of an object when said beam is broken by the object.

8. Claim 7 wherein said beam is a beam of electromagnetic radiation.

9. A method for operating a vehicle storage conveyor using a programmable digital computer system, the storage conveyor having a plurality of pans to hold the vehicles, an enclosed loading station having an entrance therein, and means for moving the pans to and from a loading area at the loading station, said method comprising:
    detecting and distinguishing between the presence of a small moving object such as a person and a large moving object such as a vehicle going through the entrance into the enclosed loading station;
    detecting the presence of the large object on the conveyor pan;
    detecting the departure of at least one small object from the enclosed loading station; and
    only after at least one small object has departed from the enclosed loading station, conveying the vehicle loaded conveyor pan away from the loading area and conveying an empty pan to the loading area.

10. A method as claimed in claim 9 and further including monitoring the interior of the loading station for persons and preventing the operation of the conveyor whenever a person is detected therein.

11. A method as claimed in claim 9 wherein said computer system can selectively control the operation of the conveyor in an automatic mode of operation and in a manual mode of operation and wherein said computer system further has an off mode in which the conveyor can not be operated, said method further including having said computer system monitor the operations of the conveyor and the interior of the loading station for three classes of improper conditions and upon the detection of any improper condition while in the automatic mode, stopping operation of the conveyor and preventing the reoperation thereof until certain action is taken, depending upon the class of the improper condition; said action for a first class of improper conditions being the manual activation of a reset signal which causes said computer system to control automatically the operation of the conveyor; said action for a second class of improper conditions requiring the clearing of said improper condition and switching the computer system to the manual mode of operation before switching back to the automatic mode; and said action for a third class of improper conditions requiring the clearing of said improper condition and switching the computer to the off mode of operation before switching back to the automatic mode.

12. A method as claimed in claim 9 and further including:
    using a tangible medium having a machine readable code thereon for each large object to be stored on the conveyor;
    storing said code in a location in an addressable table in the computer system memory corresponding to the pan in which said large object is stored, and
    retrieving the stored large object by automatically reading the code, searching said addressable table locations in said computer memory for said code, and conveying the pan corresponding to the address where said code is located to the loading area.

13. A method as claimed in claim 9 and further including:
   storing in an addressable location in a table in the computer system memory an occupancy code representative of the occupancy status of the individual pans; and
   selecting an empty pan to be conveyed to the loading area by the steps which include searching said table for an occupancy code representative of an empty pan.

14. A method as claimed in claim 13 wherein said storage conveyor is comprised of a vertical endless conveyor having a predetermined number of pans, said method further including selecting an empty pan to be conveyed to the loading area from the empty pans on the conveyor by the following steps:
   starting with the pans on either side of the pan presently located at the loading area, alternatively, successively checking the occupancy code of the table locations corresponding to the pans on either side of said present pan until an occupancy code corresponding to an empty pan is found; and
   conveying that pan to the loading area if there are a majority of pans full out of a predetermined number of pans presently located at the top of the conveyor or if the majority of pans out of a predetermined number of pans on either side of said present pan are full;
   otherwise conveying to the loading area an empty pan that is a predetermined number, greater than one, of empty pans from said present pan.

15. A method as claimed in claim 9 wherein said computer system comprises a central computer and a peripheral computer connected to and controllable by said central computer, said method further including checking with the central computer before the peripheral computer can retrieve a stored large object.

16. A method as claimed in claim 9 wherein said computer system comprises a central computer and a peripheral computer for controlling the operation of said conveyor, said method further including having said central computer control the operation of said peripheral computer by storing commands in said peripheral computer during times the operation of said peripheral computer is periodically interrupted.

* * * * *